US008938389B2

(12) United States Patent
Arakawa et al.

(10) Patent No.: US 8,938,389 B2
(45) Date of Patent: Jan. 20, 2015

(54) VOICE ACTIVITY DETECTOR, VOICE ACTIVITY DETECTION PROGRAM, AND PARAMETER ADJUSTING METHOD

(75) Inventors: Takayuki Arakawa, Tokyo (JP); Masanori Tsujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 13/139,909

(22) PCT Filed: Dec. 7, 2009

(86) PCT No.: PCT/JP2009/006659

§ 371 (c)(1), (2), (4) Date: Jun. 15, 2011

(87) PCT Pub. No.: WO2010/070839

PCT Pub. Date: Jun. 24, 2010

(65) Prior Publication Data

US 2011/0246185 A1 Oct. 6, 2011

(30) Foreign Application Priority Data

Dec. 17, 2008 (JP) ................................ 2008-321550

(51) Int. Cl.
*G10L 15/20* (2006.01)
*G10L 25/93* (2013.01)
*G10L 25/78* (2013.01)

(52) U.S. Cl.
CPC .................................... *G10L 25/78* (2013.01)
USPC ........................... 704/233; 704/210; 704/215

(58) Field of Classification Search
None
See application file for complete search history.

(56) References Cited

U.S. PATENT DOCUMENTS 4,358,738 A * 11/1982 Kahn ........................... 327/557
6,453,289 B1 * 9/2002 Ertem et al. ................. 704/225

(Continued)

FOREIGN PATENT DOCUMENTS

JP 2006-209069 A 8/2006
JP 2007-017620 A 1/2007
WO 2004/084187 A1 9/2004

OTHER PUBLICATIONS

Soleimani, S. A., and S. M. Ahadi. "Voice Activity Detection based on Combination of Multiple Features using Linear/Kernel Discriminant Analyses." Information and Communication Technologies: From Theory to Applications, 2008. ICTTA 2008. 3rd International Conference on. IEEE, 2008.*

(Continued)

*Primary Examiner* — Brian Albertalli
(74) *Attorney, Agent, or Firm* — Sughrue Mion, PLLC

(57) ABSTRACT

A frame extracting means 71 extracts frames from sample data as voice data in which whether each frame is an active voice frame or a non-active voice frame is already known. A feature quantity calculating means 72 calculates multiple feature quantities of each of the frames. A feature quantity integrating means 73 calculates an integrated feature quantity of the multiple feature quantities. A judgment means 74 judges whether each of the frames is an active voice frame or a non-active voice frame. An erroneous feature quantity calculation value calculating means 75 obtains a first erroneous feature quantity calculation value and a second erroneous feature quantity calculation value by executing prescribed calculations. A weight updating means 76 updates weights used for weighting so that the rate between the first erroneous feature quantity calculation value and the second erroneous feature quantity calculation value approaches a prescribed value.

30 Claims, 10 Drawing Sheets

(56) References Cited

U.S. PATENT DOCUMENTS

| | | | | |
|---|---|---|---|---|
| 6,615,170 | B1 * | 9/2003 | Liu et al. | 704/233 |
| 7,243,063 | B2 * | 7/2007 | Ramakrishnan et al. | 704/215 |
| 7,359,856 | B2 * | 4/2008 | Martin et al. | 704/226 |
| 7,881,927 | B1 * | 2/2011 | Reuss | 704/226 |
| 7,917,357 | B2 * | 3/2011 | Florencio et al. | 704/215 |
| 8,311,813 | B2 * | 11/2012 | Valsan | 704/214 |
| 8,554,560 | B2 * | 10/2013 | Valsan | 704/238 |
| 2003/0179888 | A1 * | 9/2003 | Burnett et al. | 381/71.8 |
| 2007/0033042 | A1 * | 2/2007 | Marcheret et al. | 704/255 |
| 2008/0120100 | A1 | 5/2008 | Takeda et al. | |

OTHER PUBLICATIONS

Yusuke Kida, et al., “Voice Activity Detection Based on Optimally Weighted Combination of Multiple Features”, The Transactions of the Institute of Electronics, Information and Communication Engineers D. Aug. 11, 2006, pp. 1820-1828, vol. 89-D, No. 8.
Recommendation G. 729, Annex B, p. 1.
“Technical Description of VAD Option 2”, ETSI EN 301, 708 V7.1.1, Dec. 1999, pp. 17-26.
Akinobu Lee, et al., “Noise Robust Real World Spoken Dialogue System using GMM Based Rejection of Unintended Inputs”, ICSLP, 2004, pp. 1-4, vol. 1.

* cited by examiner

VOICE ACTIVITY DETECTOR, VOICE ACTIVITY DETECTION PROGRAM, AND PARAMETER ADJUSTING METHOD

CROSS REFERENCE TO RELATED APPLICATION

This application is a National Stage of International Application No. PCT/JP2009/006659 filed Dec. 7, 2009, claiming priority based on Japanese Patent Application No. 2008-321550, filed Dec. 17, 2008, the contents of all of which are incorporated herein by reference in their entirety.

TECHNICAL FIELD

The present invention relates to a voice activity detector, a voice activity detection program and a parameter adjusting method. In particular, the present invention relates to a voice activity detector and a voice activity detection program for discriminating between active voice frames and non-active voice frames in an input signal, and a parameter adjusting method employed for such a voice activity detector.

BACKGROUND ART

Voice activity detection technology is widely used for various purposes. For example, the voice activity detection technology is used in mobile communications, etc. for improving the voice transmission efficiency by increasing the compression ratio of the non-active voice frames or by precisely leaving out transmission of the non-active voice frames. Further, the voice activity detection technology is widely used in noise cancellers, echo cancellers, etc. for estimating or determining the noise level in the non-active voice frames, in sound recognition systems (voice recognition systems) for improving the performance and reducing the workload, etc.

Various devices for detecting the active voice segments have been proposed (see Patent Documents 1 and 2, for example). An active voice segment detecting device described in the Patent Document 1 extracts active voice frames, calculates a first fluctuation (first variance) by smoothing the voice level, calculates a second fluctuation (second variance) by smoothing fluctuations in the first fluctuation, and judges whether each frame is an active voice frame or a non-active voice frame by comparing the second fluctuation with a threshold value. The threshold value is a previously set value. Further, the active voice segment detecting device determines active voice segments (based on the duration of active voice/non-active voice frames) according to the following judgment conditions:

Condition (1): An active voice segment that did not satisfy a minimum necessary duration is not accepted as an active voice segment. The minimum necessary duration will hereinafter be referred to as an “active voice duration threshold”.

Condition (2): A non-active voice segment sandwiched between active voice segments and satisfying (shorter than) duration for being handled as a continuous active voice segment is integrated with the active voice segments at both ends to make one active voice segment. The “duration for being handled as a continuous active voice segment” will hereinafter be referred to as a “non-active voice duration threshold” since the segment is regarded as a non-active voice segment if its duration is the non-active voice duration threshold or longer.

Condition (3): A prescribed number of frames adjoining the starting/finishing end of an active voice segment and having been judged as non-active voice segments due to their low fluctuation values are added to the active voice segment. The prescribed number of frames added to the active voice segment will hereinafter be referred to as “starting/finishing end margins”.

An active voice frame detection device described in Patent Document 2 comprises various types of feature quantity calculating units for calculating multiple types of feature quantities for each frame of voice data, a feature quantity integrating unit for calculating an integrated score by weighting the feature quantities, and an active voice frame discriminating unit for making a discrimination between an active voice frame and a non-active voice frame for each frame of the voice data based on the integrated score. The active voice frame detection device further comprises a reference data storage unit and a labeled data generating unit for preparing labeled data (in which each frame is provided with a label indicating whether the frame is an active voice frame or a non-active voice frame) and an initialization control unit and a weight updating unit for learning the weighting (weights) of the multiple types of feature quantities by using the labeled data as learning data so that the discrimination error rate of the active voice frame discriminating unit satisfies a standard. The weight learning is executed by use of a loss function (defining a loss increasing with the increase in the errors in the discrimination between active voice frames and non-active voice frames) so as to reduce the value of the loss function.

As the voice feature quantities, the active voice frame detection device described in the Patent Document 2 employs the amplitude level of the active voice waveform, a zero crossing number (how many times the signal level crosses 0 in a prescribed time period), spectral information on the sound signal, a GMM (Gaussian Mixture Model) log likelihood, etc.

Various feature quantities are described also in Non-patent Documents 1-3. For example, the value of the SNR (Signal to Noise Ratio) is described in the paragraph 4.3.3 of Non-patent Document 1 and the average of the SNR is described in the paragraph 4.3.5 of the Non-patent Document 1. The zero crossing number is described in the paragraph B.3.1.4 of Non-patent Document 2. A likelihood ratio employing an active voice GMM and a non-active voice GMM is described in Non-patent Document 3.

CITATION LIST

Patent Literature

Patent Document 1 JP-A-2006-209069
Patent Document 2 JP-A-2007-17620

Non-Patent Document

Non-patent Document 1 ETSI EN 301 708 V7.1.1
Non-patent Document 2 ITU-T G.729 Annex B
Non-patent Document 3 A. Lee, K. Nakamura, R. Nishimura, H. Saruwatari, K. Shikano, “Noise Robust Real World Spoken Dialog System Using GMM Based Rejection of Unintended Inputs,” ICSLP-2004, Vol. I, pp. 173-176, October 2004.

SUMMARY OF INVENTION

Technical Problem

As pointed out in the Patent Document 2, the accuracy of the active voice frame detection varies highly depending on noise conditions (e.g., the type of noise). This dependence is caused since each feature quantity used for the active voice frame detection has suitability/unsuitability for particular noise conditions. The active voice frame detection device described in the Patent Document 2 aims to achieve high detection performance independently of the noise conditions, by using the multiple feature quantities in an integrated manner by weighting the feature quantities.

However, in such a method (like that described in the Patent Document 2) learning the weights of the multiple feature quantities so as to reduce the discrimination error rate, the result of the learning changes depending on the unevenness between the amounts of active voice and non-active voice contained in the data used for the learning. For example, when many non-active voice frames are contained in the data used for the weight learning, the non-active voice is emphasized and errors misjudging an active voice frame as a non-active voice frame increases. In contrast, when many active voice frames are contained in the data used for the weight learning, the active voice is emphasized and errors misjudging a non-active voice frame as an active voice frame increases.

It is therefore the primary object of the present invention to provide a voice activity detector and a voice activity detection program capable of discriminating between active voice frames and non-active voice frames with high accuracy independently/irrespective of the unevenness between active voice frames and non-active voice frames contained in the learning data, and a parameter adjusting method to be employed for such a voice activity detector.

Solution to Problem

A voice activity detector in accordance with the present invention comprises: frame extracting means which extracts frames from an inputted sound signal; feature quantity calculating means which calculates multiple feature quantities of each of the extracted frames; feature quantity integrating means which calculates an integrated feature quantity as integration of the multiple feature quantities by weighting the multiple feature quantities; and judgment means which judges whether each of the frames is an active voice frame or a non-active voice frame by comparing the integrated feature quantity with a threshold value. The frame extracting means extracts frames from sample data as voice data in which whether each frame is an active voice frame or a non-active voice frame is already known. The feature quantity calculating means calculates the multiple feature quantities of each of the frames extracted from the sample data. The feature quantity integrating means calculates the integrated feature quantity of the multiple feature quantities. The judgment means judges whether each of the frames extracted from the sample data is an active voice frame or a non-active voice frame by comparing the integrated feature quantity with the threshold value. The voice activity detector further comprises: erroneous feature quantity calculation value calculating means which calculates a first erroneous feature quantity calculation value as an erroneous feature quantity calculation value regarding frames as active voice frames misjudged as non-active voice frames and a second erroneous feature quantity calculation value as an erroneous feature quantity calculation value regarding frames as non-active voice frames misjudged as active voice frames as erroneous feature quantity calculation values which are obtained by executing prescribed calculations to feature quantities of the sample data's frames whose judgment results by the judgment means are erroneous; and weight updating means which updates weights used by the feature quantity integrating means for the weighting of the multiple feature quantities so that the rate between the first erroneous feature quantity calculation value and the second erroneous feature quantity calculation value approaches a prescribed value.

A parameter adjusting method in accordance with the present invention is a parameter adjusting method for adjusting parameters used by a voice activity detector which calculates multiple feature quantities of each of frames extracted from a sound signal, calculates an integrated feature quantity as integration of the multiple feature quantities by weighting the multiple feature quantities, and judges whether each of the frames is an active voice frame or a non-active voice frame by comparing the integrated feature quantity with a threshold value. The parameter adjusting method comprises the steps of: extracting frames from sample data as voice data in which whether each frame is an active voice frame or a non-active voice frame is already known; calculating the multiple feature quantities of each of the frames extracted from the sample data; calculating the integrated feature quantity of each of the frames extracted from the sample data by weighting the multiple feature quantities; judging whether each of the frames extracted from the sample data is an active voice frame or a non-active voice frame by comparing the integrated feature quantity with the threshold value; calculating a first erroneous feature quantity calculation value as an erroneous feature quantity calculation value regarding frames as active voice frames misjudged as non-active voice frames and a second erroneous feature quantity calculation value as an erroneous feature quantity calculation value regarding frames as non-active voice frames misjudged as active voice frames as erroneous feature quantity calculation values which are obtained by executing prescribed calculations to feature quantities of the sample data's frames whose results of the judgment between active voice frames and non-active voice frames are erroneous; and updating weights used for the weighting of the multiple feature quantities so that the rate between the first erroneous feature quantity calculation value and the second erroneous feature quantity calculation value approaches a prescribed value.

A voice activity detection program in accordance with the present invention causes a computer to execute: a frame extracting process of extracting frames from an inputted sound signal; a feature quantity calculating process of calculating multiple feature quantities of each of the extracted frames; a feature quantity integrating process of calculating an integrated feature quantity as integration of the multiple feature quantities by weighting the multiple feature quantities; and a judgment process of judging whether each of the frames is an active voice frame or a non-active voice frame by comparing the integrated feature quantity with a threshold value. The voice activity detection program causes the computer to execute the frame extracting process to sample data as voice data in which whether each frame is an active voice frame or a non-active voice frame is already known. The voice activity detection program causes the computer to execute the feature quantity calculating process to each of the frames extracted from the sample data. The voice activity detection program causes the computer to execute the feature quantity integrating process to the multiple feature quantities of each of the frames extracted from the sample data. The voice activity detection program causes the computer to execute the judgment process to the integrated feature quantity calculated in the feature quantity integrating process. The voice activity detection program further causes the computer to execute: an erroneous feature quantity calculation value calculating process of calculating a first erroneous feature quantity calculation value as an erroneous feature quantity calculation value regarding frames as active voice frames misjudged as non-active voice frames and a second erroneous feature quantity calculation value as an erroneous feature quantity calculation value regarding frames as non-active voice frames misjudged as active voice frames as erroneous feature quantity calculation values which are obtained by executing prescribed calculations to feature quantities of the sample data's frames whose judgment results by the judgment process are erroneous; and a weight updating process of updating weights used for the weighting of the multiple feature quantities so that the rate between the first erroneous feature quantity calculation value and the second erroneous feature quantity calculation value approaches a prescribed value.

Advantageous Effects of the Invention

By the present invention, the judgment (discrimination) between active voice frames and non-active voice frames can be made with high accuracy independently/irrespective of the unevenness between active voice frames and non-active voice frames contained in the learning data.

DESCRIPTION OF EMBODIMENTS

Figure 1:
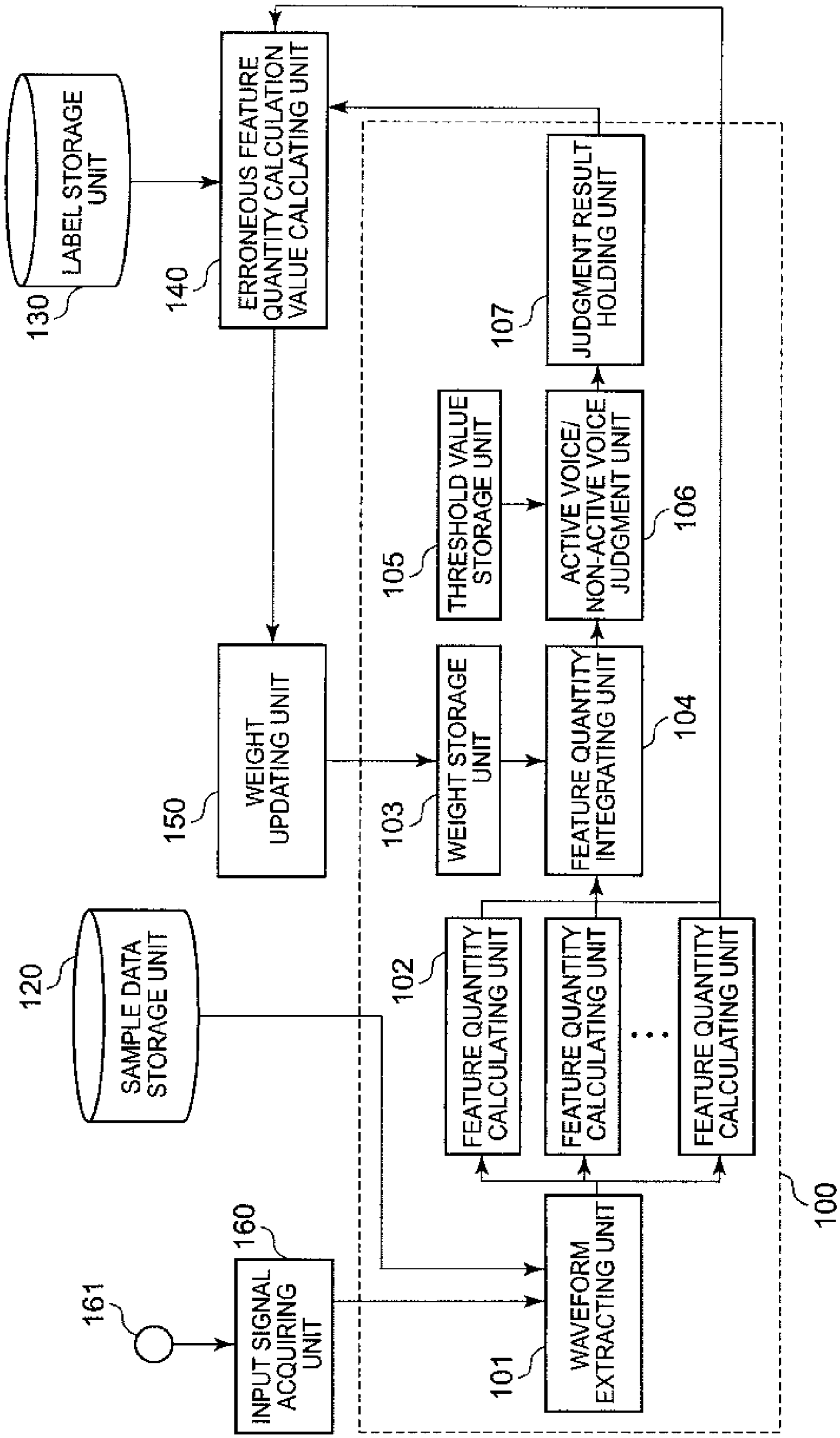
FIG. 1 It depicts a block diagram showing an example of the configuration of a voice activity detector in accordance with a first embodiment of the present invention.

Referring now to the drawings, a description will be given in detail of preferred embodiments in accordance with the present invention. Incidentally, the voice activity detector in accordance with the present invention can be referred to also as an “active voice frame discriminating device” since the device discriminates between active voice frames and non-active voice frames in a sound signal inputted to the device.

First Embodiment

FIG. 1 is a block diagram showing an example of the configuration of a voice activity detector in accordance with a first embodiment of the present invention. The voice activity detector of the first embodiment includes a voice activity detection unit 100, a sample data storage unit 120, a label storage unit 130, an erroneous feature quantity calculation value calculating unit 140, a weight updating unit 150 and an input signal acquiring unit 160.

The voice activity detector in accordance with the present invention extracts frames from the inputted sound signal and executes the judgment for discriminating between an active voice frame and a non-active voice frame for each frame. In this judgment process, the voice activity detector calculates multiple feature quantities of each frame, integrates the calculated feature quantities by weighting each feature quantity, compares the result of the integration with a threshold value, and thereby judges whether each frame is an active voice frame or a non-active voice frame. Further, the voice activity detector makes the judgment (discrimination between active voice frames and non-active voice frames) for previously prepared sample data (in which whether each frame is an active voice frame or a non-active voice frame has already been determined in order of the time series) and determines the weight (weighting coefficient) for each feature quantity by referring to the result of the judgment. In the judgment process for the inputted sound signal, the voice activity detector carries out the judgment by weighting each feature quantity by use of the determined weight.

The voice activity detection unit 100 makes the discrimination between active voice frames and non-active voice frames in the sample data or the inputted sound signal. The voice activity detection unit 100 includes a waveform extracting unit 101, feature quantity calculating units 102, a weight storage unit 103, a feature quantity integrating unit 104, a threshold value storage unit 105, an active voice/non-active voice judgment unit 106 and a judgment result holding unit 107.

The waveform extracting unit 101 successively extracts waveform data of each frame (for a unit time) from the sample data or the inputted sound signal in order of time. In other words, the waveform extracting unit 101 extracts frames from the sample data or the sound signal. The length of the unit time may be set previously.

Each feature quantity calculating unit 102 calculates a voice feature quantity in regard to each frame extracted by the waveform extracting unit 101. The voice activity detection unit 100 (feature quantity calculating units 102) calculates multiple feature quantities for each frame. While a case where multiple feature quantity calculating units 102 calculate separate feature quantities is shown in FIG. 1, the voice activity detection unit 100 may also be configured to include only one feature quantity calculating unit which calculates multiple feature quantities.

The weight storage unit 103 stores each weight (weighting coefficient) corresponding to each feature quantity calculated by the feature quantity calculating unit 102. In short, the weight storage unit 103 stores the weights corresponding to the feature quantities, respectively. The weights stored in the weight storage unit 103 (initial values in the initial state) are successively updated by the weight updating unit 150.

The feature quantity integrating unit 104 weights the feature quantities calculated by the feature quantity calculating units 102 by use of the weights stored in the weight storage unit 103 and thereby integrates the feature quantities. The result of the integration of the feature quantities will hereinafter be referred to as an “integrated feature quantity”.

The threshold value storage unit 105 stores a threshold value to be used for the judgment on whether each frame corresponds to an active voice frame or a non-active voice frame (hereinafter referred to as a "judgment threshold value"). The judgment threshold value is previously stored in the threshold value storage unit 105. In the following explanation, the judgment threshold value is represented as "θ".

The active voice/non-active voice judgment unit 106 makes the judgment on whether each frame corresponds to an active voice frame or a non-active voice frame by comparing the integrated feature quantity calculated by the feature quantity integrating unit 104 with the judgment threshold value θ.

The judgment result holding unit 107 holds the result of the judgment on each frame across a plurality of frames.

The sample data storage unit 120 stores the sample data, that is, voice data to be used for learning the weights of the feature quantities. Here, the "learning" means appropriately setting the weight of each feature quantity. The sample data may also be called "learning data" for the learning of the weights of the feature quantities.

The label storage unit 130 stores labels (regarding whether each frame is an active voice frame or a non-active voice frame) previously determined for the sample data.

The erroneous feature quantity calculation value calculating unit 140 calculates an erroneous feature quantity calculation value by referring to the judgment result for the sample data, the labels and the feature quantities calculated by the feature quantity calculating units 102. The erroneous feature quantity calculation value is a value obtained by executing a prescribed calculation to feature quantities of erroneously judged (misjudged) frames (i.e., frames whose judgment result differs from the label). The definition of the erroneous feature-quantity calculation value will be explained later. The erroneous feature quantity calculation value calculating unit 140 calculates the erroneous feature quantity calculation value of frames (as active voice frames) misjudged as non-active voice frames and the erroneous feature quantity calculation value of frames (as non-active voice frames) misjudged as active voice frames. The erroneous feature quantity calculation value calculating unit 140 calculates the two types of erroneous feature quantity calculation values for each of the various types of feature quantities.

The weight updating unit 150 updates the weights corresponding to the feature quantities based on the erroneous feature quantity calculation values calculated by the erroneous feature quantity calculation value calculating unit 140 for each type of feature quantity. In short, the weight updating unit 150 updates the weights stored in the weight storage unit 103.

The input signal acquiring unit 160 converts an analog signal of inputted voice into a digital signal and inputs the digital signal to the waveform extracting unit 101 of the voice activity detection unit 100 as the sound signal. The input signal acquiring unit 160 may acquire the sound signal (analog signal) via a microphone 161, for example. The sound signal may of course be acquired by a different method.

The waveform extracting unit 101, the feature quantity calculating units 102, the feature quantity integrating unit 104, the active voice/non-active voice judgment unit 106, the erroneous feature quantity calculation value calculating unit 140 and the weight updating unit 150 may be implemented by separate hardware modules, or by a CPU operating according to a program (voice activity detection program). Specifically, the CPU may load the program previously stored in program storage means (not illustrated) of the voice activity detector and operate as the waveform extracting unit 101, feature quantity calculating units 102, feature quantity integrating unit 104, active voice/non-active voice judgment unit 106, erroneous feature quantity calculation value calculating unit 140 and weight updating unit 150 according to the loaded program.

The weight storage unit 103, the threshold value storage unit 105, the judgment result holding unit 107, the sample data storage unit 120 and, the label storage unit 130 are implemented by a storage device, for example. The type of the storage device is not particularly restricted. The input signal acquiring unit 160 is implemented by, for example, an A/D converter or a CPU operating according to a program.

Next, the sample data and the labels will be explained below. While voice data like 16-bit Linear-PCM (Pulse Code Modulation) data can be taken as an example of the sample data stored in the sample data storage unit 120, other types of voice data may also be used. The sample data is desired to be voice data recorded in a noise environment in which the voice activity detector is supposed to be used. However, when such a noise environment can not be specified, voice data recorded in multiple noise environments may also be used as the sample data. It is also possible to record clean voice (including no noise) and noise separately, create data with a computer by superposing the clean voice on the noise, and use the created data as the sample data.

The labels stored in the label storage unit 130 are data indicating whether the sample data corresponds to an active voice frame or a non-active voice frame. The labels may be determined by a human by listening to voice according to the sample data and judging (discriminating) between active voice frames and non-active voice frames, or by automatically labeling each frame in the sample data as an active voice frame or a non-active voice frame by executing a sound recognition process (voice recognition process) to the sample data. In the case where the sample data is obtained by superposing clean voice on noise, the labeling between active voice frames and non-active voice frames may be conducted by executing a separate voice detection process (according to a standard sound detection technique) to the clean voice. In either way of creating the sample data and the labels, it is desirable if both the sample data and the labels are associated with a time series.

In the following, the operation will be described.

Figure 2:
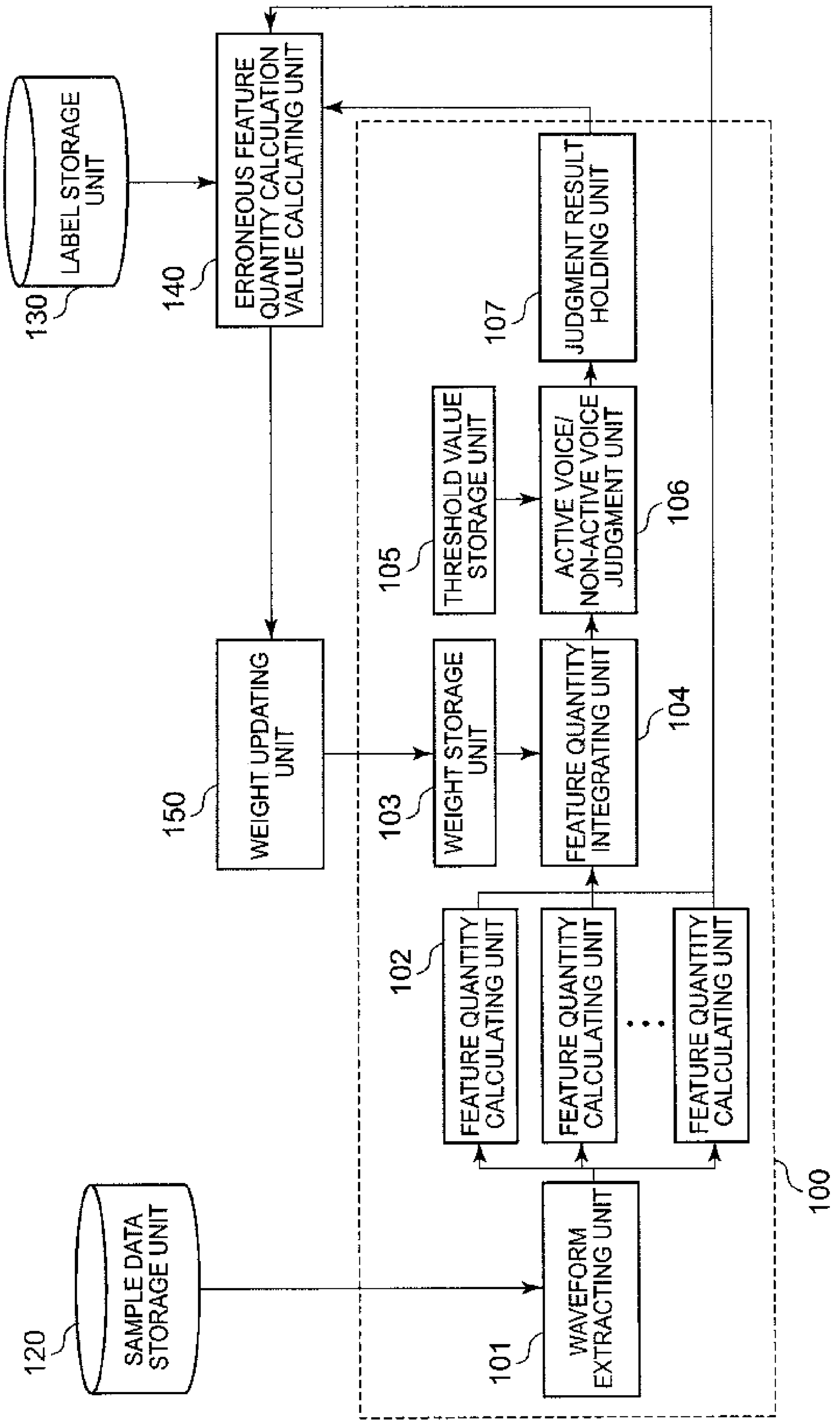
FIG. 2 It depicts a block diagram showing a part of the components of the voice activity detector of the first embodiment relating to a learning process.
Figure 3:
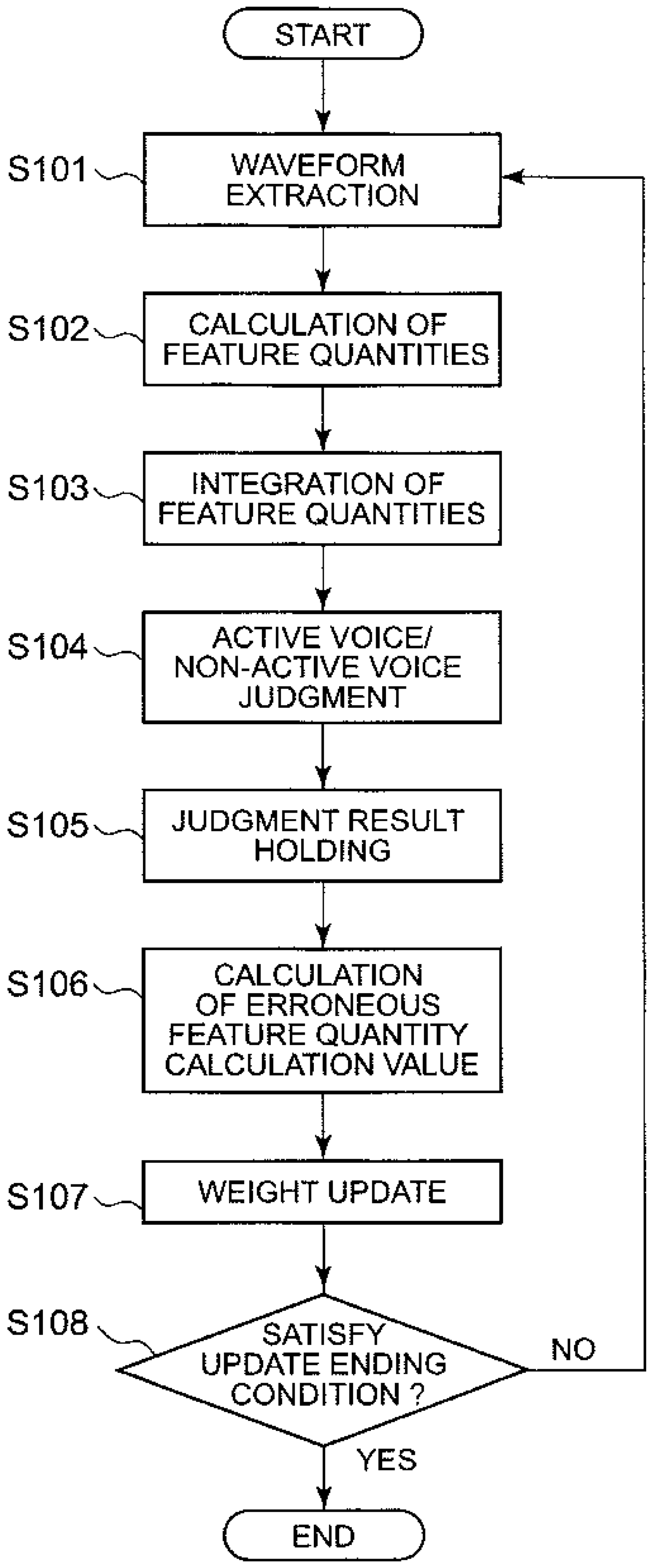
FIG. 3 It depicts a flow chart showing an example of the progress of the learning process.

FIG. 2 is a block diagram showing a part of the components of the voice activity detector of the first embodiment relating to a learning process for learning the weights corresponding to the voice feature quantities. FIG. 3 is a flow chart showing an example of the progress of the learning process. The operation of the learning process will be explained below referring to FIGS. 2 and 3.

First, the waveform extracting unit 101 reads out the sample data stored in the sample data storage unit 120 and extracts the waveform data of each frame (for the unit time) from the sample data in order of the time series (step S101). For example, the waveform extracting unit 101 may successively extract the waveform data of each frame (for the unit time) while successively shifting the extraction target part (as the target of the extraction from the sample data) by a prescribed time. The unit time and the prescribed time will hereinafter be referred to as a "frame width" and a "frame shift", respectively. For example, when the sample data stored in the sample data storage unit 120 is 16-bit Linear-PCM voice data with a sampling frequency of 8000 Hz, the sample data includes waveform data of 8000 points per second. In this case, the waveform extracting unit 101 may, for example, successively extract waveform data having a frame width of 200 points (25 msec) from the sample data in order of the time series with a frame shift of 80 points (10 msec), that is, successively extract waveform data of 25 msec frames from the sample data while successively shifting the extraction target part by 10 msec. Incidentally, the type of the sample data and the values of the frame width and the frame shift are not restricted to the above example used just for illustration.

Subsequently, the feature quantity calculating units 102 calculate the multiple feature quantities from each piece of waveform data successively extracted from the sample data for the frame width by the waveform extracting unit 101 (step S102). In this step S102, the feature quantity calculating units 102 calculate separate feature quantities. In cases where the feature quantity calculating units 102 are implemented by a single device (e.g., CPU), the single device may calculate the multiple feature quantities for each piece of waveform data. The feature quantities calculated in this step S102 may include, for example, data obtained by smoothing fluctuations in the spectrum power (sound level) and further smoothing fluctuations in the result of the smoothing (i.e., data corresponding to the second fluctuation in the Patent Document 1), the value of the SNR described in the Non-patent Document 1, the average of the SNR described in the Non-patent Document 1, the zero crossing number described in the Non-patent Document 2, the likelihood ratio employing an active voice GMM and a non-active voice GMM described in the Non-patent Document 3, etc. However, these feature quantities are just an example and other feature quantities may also be calculated in the step S102.

While calculation of the multiple feature quantities for one preset frame width and one preset frame shift has been described here, the calculation of the feature quantities may also be carried out for multiple types of frame widths and frame shifts.

When there are two or more channels, the multiple feature quantities may be calculated for each channel. For example, when the sample data is data recorded using two or more channels (two or more microphones) like stereophonic data or when two or more microphones 161 (see FIG. 1) are used for inputting the sound signal, the multiple feature quantities may be calculated for each channel. In this case where there are two or more channels, it is also possible to calculate multiple feature quantities by calculating a single feature quantity for each channel.

After the step S102, the feature quantity integrating unit 104 integrates the calculated feature quantities using the weights stored in the weight storage unit 103 (step S103). In this step S103, the weighting for the feature quantities is executed using the weights stored (existing) in the weight storage unit 103 at the point in time. When the process advances to the step S103 for the first time, for example, the weighting is carried out using the initial values of the weights.

The number of feature quantities calculated in the step S102 is assumed to be K, and the K feature quantities calculated for the waveform data of the t-th frame are represented as $f_{1t}, f_{2t}, \ldots, f_{kt}$, respectively. The weights corresponding to the K feature quantities are represented as $w_1, w_2, \ldots, w_k$ respectively. The integrated feature quantity calculated for the t-th frame by weighting the feature quantities is represented as $F_t$. The feature quantity integrating unit 104 calculates the integrated feature quantity $F_t$ according to the following expression (1), for example:

$$F_t=\Sigma_k w_k \times f_{kt} \tag{1}$$

In the expression (1), "t" is a subscript for the frame and "k" is a subscript for each type of feature quantity.

Subsequently, the active voice/non-active voice judgment unit 106 judges whether each frame is an active voice frame or a non-active voice frame by comparing the integrated feature quantity $F_t$ with the judgment threshold value θ stored in the threshold value storage unit 105. For example, the active Voice/non-active voice judgment unit 106 judges that the frame t is an active voice frame if the integrated feature quantity $F_t$ is greater than the judgment threshold value θ while judging that the frame t is a non-active voice frame if the integrated feature quantity $F_t$ is the judgment threshold value θ or less. There can be a feature quantity that takes on low values in active voice frames and high values in non-active voice frames. In such cases, the feature quantity can be handled similarly in the above judgment by inverting the sign of the feature quantity.

The active voice/non-active voice judgment unit 106 makes the judgment result holding unit 107 hold the result of the judgment (whether each frame corresponds to an active voice frame or a non-active voice frame) for a plurality of frames (step S105). It is desirable that the number of the frames (for which the result of the judgment between active voice frames and non-active voice frames should be held in the judgment result holding unit 107) be changeable. The judgment result holding unit 107 may be configured to store the judgment result for frames corresponding to an entire utterance, or for frames for several seconds, for example.

Subsequently, the erroneous feature quantity calculation value calculating unit 140 calculates the erroneous feature quantity calculation values by referring to the judgment result (regarding the discrimination between active voice frames and non-active voice frames) for a plurality of frames (i.e., the judgment result held by the judgment result holding unit 107), the labels stored in the label storage unit 130 and the feature quantities calculated by the feature quantity calculating units 102 (step S106). As already explained above, the erroneous feature quantity calculation value calculating unit 140 calculates the erroneous feature quantity calculation value of the frames as active voice frames misjudged as non-active voice frames and the erroneous feature quantity calculation value of the frames as non-active voice frames misjudged as active voice frames. The erroneous feature quantity calculation value of the frames as active voice frames misjudged as non-active voice frames will hereinafter be represented as an "FRFR (False Rejection Feature Ratio)", while the erroneous feature quantity calculation value of the frames as non-active voice frames misjudged as active voice frames will hereinafter be represented as an "FAFR (False Acceptance Feature Ratio)". The FRFR and FAFR are calculated for each of the multiple types of feature quantities calculated in the step S102. The FRFR and FAFR regarding the k-th feature quantity (included in the K feature quantities) will hereinafter be represented as an "$FRFR_k$" and an "$FAFR_k$" using the subscript k.

The $FRFR_k$ and $FAFR_k$ are defined by the following expressions (2) and (3), respectively:

$$FRFR_k \equiv \Sigma_{t\in FR} f_{kt} \div \text{(the number of the detected active voice frames)} \tag{2}$$

$$FAFR_k \equiv \Sigma_{t\in FA} f_{kt} \div \text{(the number of the detected non-active voice frames)} \tag{3}$$

In the expression (2), "t∈FR" means frames (included in the plurality of frames for which the judgment result is held in the judgment result holding unit 107) misjudged as non-active voice frames in contradiction to their labels representing active voice frames. Thus, "$\Sigma_{t\in FR} f_{kt}$" means the sum of the k-th feature quantities of such frames. The "number of the detected active voice frames" in the expression (2) means the number of frames (included in the plurality of frames for which the judgment result is held) correctly judged as active voice frames in agreement with their labels representing active voice frames.

In the expression (3), "$t \in FA$" means frames (included in the plurality of frames for which the judgment result is held in the judgment result holding unit 107) misjudged as active voice frames in contradiction to their labels representing non-active voice frames. Thus, "$\Sigma_{t \in FA} f_{kt}$" means the sum of the k-th feature quantities of such frames. The "number of the detected non-active voice frames" in the expression (3) means the number of frames (included in the plurality of frames for which the judgment result is held) correctly judged as non-active voice frames in agreement with their labels representing non-active voice frames.

The erroneous feature quantity calculation value calculating unit 140 calculates the $FRFR_k$ and $FAFR_k$ according to the expressions (2) and (3), respectively, for each type of feature quantity calculated in the step S102.

After the erroneous feature quantity calculation values ($FRFR_k$ and $FAFR_k$) have been calculated in the step S106, the weight updating unit 150 updates the weights stored in the weight storage unit 103 based on the erroneous feature quantity calculation values (step S107). The weight updating unit 150 may update the weights according to the following expression (4):

$$w_k \leftarrow w_k + \epsilon \times (\alpha \times FRFR_k - (1-\alpha) \times FAFR_k) \tag{4}$$

The "$w_k$" on the left side of the expression (4) represents the weight of the feature quantity after the update, while the "$w_k$" on the right side represents the weight of the feature quantity before the update. Thus, the weight updating unit 150 may calculate $w_k + \epsilon \times (\alpha \times FRFR_k - (1-\alpha) \times FAFR_k)$ using the weight $w_k$ before the update and then regard the calculation result as the weight $w_k$ after the update. This weight update is an update process based on the theory of the steepest descent method.

In the expression (4), "$\epsilon$" represents the step size of the update. In other words, $\epsilon$ is a value specifying the magnitude of the update of the weight $w_k$ in one update process of the step S107. It is possible to use a fixed value as $\epsilon$, or to initially set $\epsilon$ at a high value and gradually decrease the value of $\epsilon$.

Meanwhile, "$\alpha$" is a parameter for controlling the weighting rate between the two types of errors (the error misjudging an active voice frame as a non-active voice frame and the error misjudging a non-active voice frame as an active voice frame) in the update of the weight. The parameter $\alpha$ is previously set at a value within a range from 0 to 1. By the repeated execution of the update process of the expression (4) in the repetition of the loop process, the rate between the two erroneous feature quantity calculation values approaches the rate represented by the following expression (5). Therefore, a may be regarded as a parameter representing the target value of the rate between $FAFR_k$ and $FRFR_k$.

$$FAFR_k : FRFR_k = \alpha : 1-\alpha \tag{5}$$

When $\alpha$ is set higher than 0.5, $FRFR_k$ is more emphasized than $FAFR_k$ as is clear from the expression (4), by which the weight is updated so as to reduce the error misjudging an active voice frame as a non-active voice frame. Conversely, when $\alpha$ is set lower than 0.5, $FAFR_k$ is more emphasized than $FRFR_k$ as is clear from the expression (4), by which the weight is updated so as to reduce the error misjudging a non-active voice frame as an active voice frame.

In the step S107, the weight updating unit 150 may also execute the update of each weight by further employing a constraint condition that the sum or the sum of squares of the weights $w_k$ of the feature quantities is kept constant. For example, when a constraint condition that the sum of the weights $w_k$ of the feature quantities is constant is employed, the weight updating unit 150 may update each weight $w_k$ by further executing the following calculation (6) to each weight $w_k$ obtained by the expression (4).

$$w_k \leftarrow w_k / \Sigma_{k'} w_{k'} \tag{6}$$

Subsequently, the weight updating unit 150 judges whether an ending condition for the weight update is satisfied or not (step S108). If the update ending condition is satisfied ("Yes" in step S108), the weight learning process is ended. If the update ending condition is not satisfied ("No" in step S108), the process from the step S101 is repeated. In the step S103 in this case, the integrated feature quantity $F_t$ is calculated using the weights updated in the immediately preceding step S107. As an example of the update ending condition, a condition that "the change in the weight of each feature quantity caused by the update is less than a preset value" may be used, that is, the weight updating unit 150 may judge whether the condition "the change in the weight caused by the update (the difference between the weight after the update and the weight before the update) is less than a preset value" is satisfied or not. It is also possible to employ a condition that the learning has been conducted using the entire sample data a prescribed number of times (i.e., a condition that the process from S101 to S108 has been executed a prescribed number of times).

Figure 4:
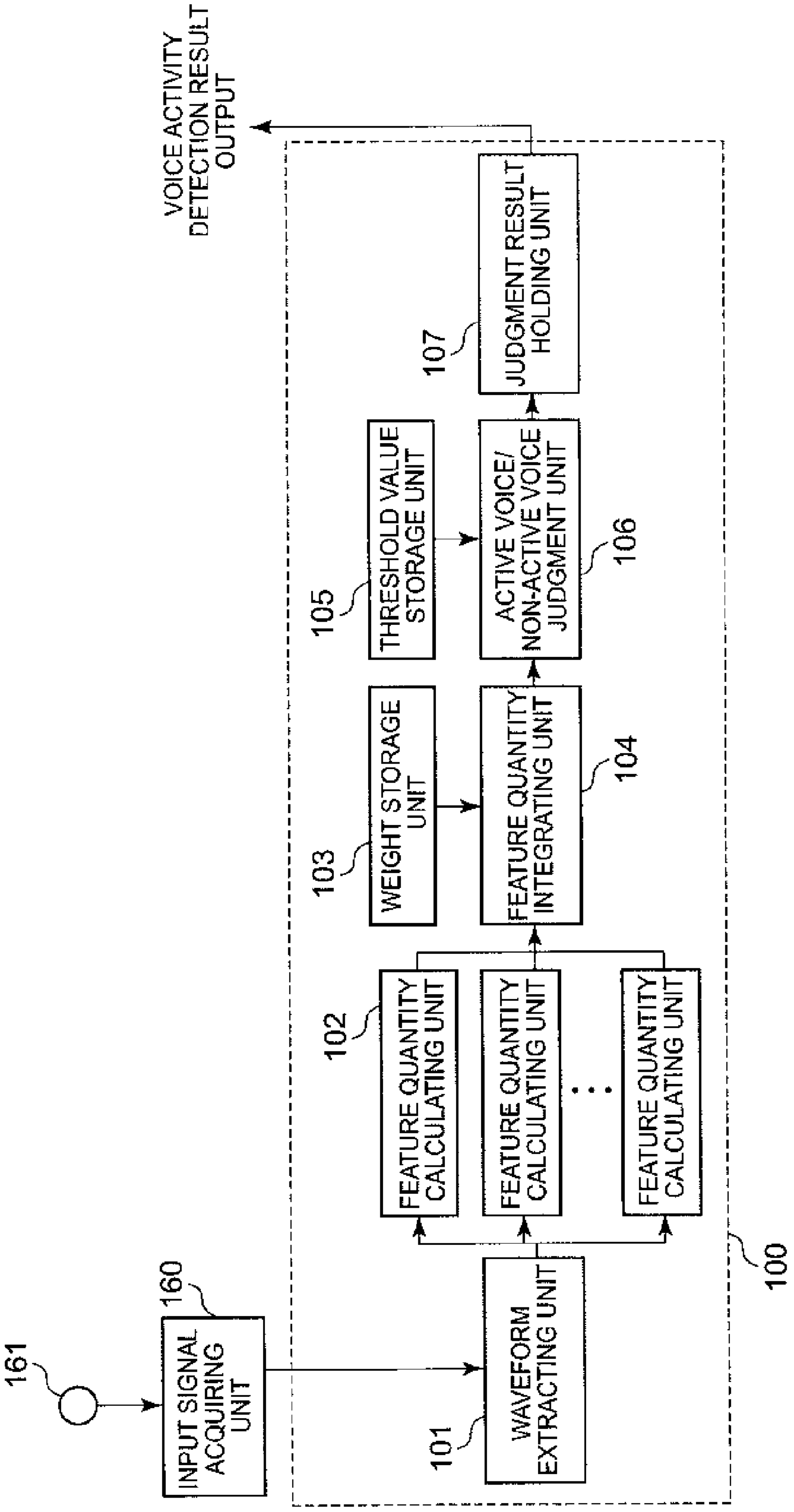
FIG. 4 It depicts a block diagram showing a part of the components of the voice activity detector of the first embodiment relating to a judgment on whether each frame of an inputted sound signal is an active voice frame or a non-active voice frame.

FIG. 4 is a block diagram showing a part of the components of the voice activity detector of the first embodiment relating to the judgment on whether each frame of the inputted sound signal is an active voice frame or a non-active voice frame. The operation for judging whether each frame of the inputted sound signal is an active voice frame or a non-active voice frame using the weights of the feature quantities obtained by the learning will be explained below.

First, the input signal acquiring unit 160 acquires the analog signal of the voice as the target of the judgment (discrimination) between active voice frames and non-active voice frames, converts the analog signal into the digital signal, and inputs the digital signal to the voice activity detection unit 100. The acquisition of the analog signal may be made using the microphone 161 or the like, for example. Upon input of the sound signal, the voice activity detection unit 100 makes the judgment on whether each frame of the sound signal is an active voice frame or a non-active voice frame by executing a process similar to the steps S101-S105 (see FIG. 3) to the sound signal.

Specifically, the waveform extracting unit 101 extracts the waveform data of each frame from the inputted voice data and the feature quantity calculating units 102 calculate the feature quantities of each piece of waveform data (steps S101 and S102). Subsequently, the feature quantity integrating unit 104 calculates the integrated feature quantity by weighting the feature quantities (step S103). The weights determined by the learning based on the sample data have already been stored in the weight storage unit 103. The feature quantity integrating unit 104 conducts the weighting by use of the weights stored in the weight storage unit 103. Subsequently, the active voice/non-active voice judgment unit 106 makes the judgment (discrimination) between an active voice frame or a non-active voice frame for each frame by comparing the integrated feature quantity with the judgment threshold value $\theta$ (step S104) and then makes the judgment result holding unit 107 hold the judgment result (step S105). The result held by the judgment result holding unit 107 is used as output data. By the above process, the result of the judgment (discrimination) between an active voice frame and a non-active voice frame can be obtained for each frame of the voice data.

Next, the derivation of the expressions (2), (3) and (4) will be explained. The status of the frame t in question is defined as "$\sigma_t$". The status $\sigma_t$ equals +1 ($\sigma_t$=+1) when the frame t in question is an active voice frame, while the status $\sigma_t$ equals −1 ($\sigma_t=-1$) when the frame t in question is a non-active voice frame. The status of a plurality of frames (frame 1-frame t) is represented as $\{F_{1:t}\}=\{\sigma_{1:t}\}=\{\sigma_1, \sigma_2, \ldots, \sigma_t\}$. The integrated feature quantities across the plurality of frames are represented as $\{F_{1:t}\}=\{F_1, F_2, \ldots, F_t\}$.

First, a case where the error misjudging an active voice frame as a non-active voice frame and the error misjudging a non-active voice frame as an active voice frame are not discriminated from each other will be described. The probability $P(\{\sigma_{1:t}\}|\{F_{1:t}\})$ that the status of the plurality of frames is $\{\sigma_{1:t}\}$ when integrated feature quantities $\{F_{1:t}\}$ are obtained can be expressed by a log-linear model represented by the following expressions (7) and (8):

$$P(\{\sigma_{1:t}\}|\{F_{1:t}\})=\exp[\gamma\times\Sigma_t\{(F_t-\theta)\times\sigma_t\}]\div Z \quad (7)$$

$$Z=\Sigma_{\{s1:t\}}\exp[\gamma\times\Sigma_t\{(F_t-\theta)\times s_t\}] \quad (8)$$

In the above expressions, "γ" is a parameter representing the degree of reliability (hereinafter fixed at 1 ($\gamma=1$) since the value itself is not essential), and "Z" is a term (factor) for normalization.

The symbol "$\Sigma_{\{s1:t\}}$" represents the sum for the combination of all statuses. As will be explained later, the parameter $s_t$ is set at +1 ($s_t=+1$) when the integrated feature quantity $F_t$ is greater than the judgment threshold value, while the parameter $s_t$ is set at −1 ($s_t=-1$) when the integrated feature quantity $F_t$ is less than the judgment threshold value.

In the log-linear model of the expression (7), logarithmic values can be expressed in the form of summation as in the following expression (9):

$$\log[P(\{\sigma_{1:t}\}|\{F_{1:t}\})]=\gamma\times\Sigma_t\{(F_t-\theta)\times\sigma_t\}-\log Z \quad (9)$$

In an active voice frame as an active voice frame, $\sigma_t=+1$ holds and thus the logarithmic value of the probability is increased by $F_t-\theta$. In a non-active voice frame as a non-active voice frame, $\sigma_t=-1$ holds and thus the logarithmic value of the probability is increased by $-F_t+\theta$. When the integrated feature quantity $F_t$ is greater than the judgment threshold value θ in active voice frames and less than the judgment threshold value θ in non-active voice frames, the probability increases since all the added terms are positive. Conversely, when the integrated feature quantity $F_t$ is less than the judgment threshold value θ even though the frame t is an active voice frame or when the integrated feature quantity $F_t$ is greater than the judgment threshold value θ even though the frame t is a non-active voice frame, the probability decreases since a negative value is added to the probability.

Next, a method for discriminating between the error misjudging an active voice frame as a non-active voice frame and the error misjudging a non-active voice frame as an active voice frame will be described. In order to control the rate between the error misjudging an active voice frame as a non-active voice frame and the error misjudging a non-active voice frame as an active voice frame, the expression (9) is rewritten to the following expression (10):

$$\log[P(\{(\sigma_{1:t}\}|\{F_{1:t}\})]=\gamma\times\alpha\times\Sigma_{t\in ACTIVE\ VOICE}\{(F_t-\theta)\times\sigma_t\}\div N_s+\gamma\times(1-\alpha)\times\Sigma_{t\in NON\text{-}ACTIVE\ VOICE}\{(F_t-\theta)\times\sigma_t\}\div N_n-\log Z \quad (10)$$

The symbol "$\Sigma_{t\in ACTIVE\ VOICE}$" represents the sum regarding active voice frames and "$N_s$" represents the number of active voice frames. The symbol "$\Sigma_{t\Sigma NON\text{-}ACTIVE\ VOICE}$" represents the sum regarding non-active voice frames and "$N_n$" represents the number of non-active voice frames. As mentioned above, "α" (value within the range from 0 to 1) is the parameter for controlling the weighting rate between the two types of errors (the error misjudging an active voice frame as a non-active voice frame and the error misjudging a non-active voice frame as an active voice frame) in the weight update. The division by the number of active voice frames and the division by the number of non-active voice frames are for normalizing the unevenness between the numbers of active voice frames and non-active voice frames contained in the learning data. The factor "Z" is for the normalization of the probability value.

In order to optimize parameters relating to the voice activity detection, parameters that maximize the value of the expression (10) for the status $\{\sigma_{1:t}\}$ of the labels for the frames are obtained. By using the steepest descent method, the following expression (11) is obtained for the weights $w_k$ of the multiple feature quantities:

$$w_k\leftarrow w_k+\epsilon\times\nabla\log[P(\{\sigma_{1:t}\}|\{F_{1:t}\})] \quad (11)$$

In the expression (11), "ϵ" represents the step size, and "∇" represents partial differentiation with respect to $w_k$.

The part $\nabla\log[P(\{\sigma_{1:t}\}|\{F_{1:t}\})]$ is calculated as indicated by the following expression (12):

$$\begin{aligned}\nabla\log[P(\{\sigma_{1:t}\}\mid\{F_{1:t}\})] = {} & \gamma\times\alpha\times\sum_{t\in ACTIVE\ VOICE} f_{kt}\div N_s - \\ & \gamma\times(1-\alpha)\times\sum_{t\in NON\text{-}ACTIVE\ VOICE} f_{kt}\div N_n - \\ & \gamma\times\alpha\times E\left[\sum_{t\in ACTIVE\ VOICE} f_{kt}s_t\right]\div N_s - \\ & \gamma\times(1-\alpha)\times E\left[\sum_{t\in NON\text{-}ACTIVE\ VOICE} f_{kt}s_t\right]\div N_n \cong \\ & \gamma\times\alpha\times 2\times\sum_{t\in FR} f_{kt}\div N_s-\gamma\times(1-\alpha)\times 2\times\sum_{t\in FA} f_{kt}\div N_n\end{aligned} \quad (12)$$

"E[A]" represents the calculation of the expected value, which can be represented as the following expression (13):

$$E[A]=\Sigma_{\{s1:t\}}\{A\times P(\{\sigma_{1:t}\}|\{F_{1:t}\})\} \quad (13)$$

The approximation in the expression (12) is used for the following reason: In order to obtain the expression (13), it is originally necessary to calculate the probability value defined by the expression (10) for the combination of all statuses. However, the calculation requires an extremely high cost. Therefore, the approximation assuming that the parameter $s_t$ equals +1 ($s_t=+1$) if the integrated feature quantity $F_t$ is greater than the judgment threshold value θ and equals −1 ($s_t=-1$) if the integrated feature quantity $F_t$ is less than the judgment threshold value θ (irrespective of the probability value) is used. The expressions (2), (3) and (4) are derived as explained above.

Next, the effect of this embodiment will be explained.

Referring to the expression (4), when the second term $\epsilon\times(\alpha\times FRFR_k-(1-\alpha)\times FAFR_k)$ of the right side is positive, the update is executed so as to increase the weight of the feature quantity being considered. Conversely, when the second term of the right side is negative, the update is executed so as to decrease the weight of the considered feature quantity. When the second term of the right side equals 0, the update is not executed. By this process, the weights can be set appropriately for improving the discrimination performance as explained below.

When the second term of the right side of the expression (4) is positive, the erroneous feature quantity calculation value of the frames as active voice frames misjudged as non-active voice frames is greater than the erroneous feature quantity calculation value of the frames as non-active voice frames misjudged as active voice frames. Since the likelihood of active voice increases with the increase in the feature quantity, this feature quantity is considered to be more reliable in this case. Thus, the improvement of the discrimination performance can be expected by increasing the weight of this feature quantity.

On the other hand, when the second term of the right side of the expression (4) is negative, the erroneous feature quantity calculation value of the frames as active voice frames misjudged as non-active voice frames is less than the erroneous feature quantity calculation value of the frames as non-active voice frames misjudged as active voice frames. In this case, the improvement of the discrimination performance can be expected by decreasing the weight of this feature quantity since discrimination using this feature quantity appears to be difficult.

When the second term of the right side of the expression (4) equals 0, the weight of the feature quantity is desired to be left unchanged since the error misjudging an active voice frame as a non-active voice frame and the error misjudging a non-active voice frame as an active voice frame are well balanced.

In the present invention, even when learning data having the unevenness (in which the number of active voice frames is considerably larger/smaller than that of non-active voice frames) is used, the rate between the tendency to misjudge an active voice frame as a non-active voice frame and the tendency to misjudge a non-active voice frame as an active voice frame can be made constant by setting the parameter α and updating the weights of the multiple feature quantities using the erroneous feature quantity calculation values. Since the weights of the multiple feature quantities can be learned robustly independently/irrespective of the unevenness of the learning data as above, the object of the present invention can be achieved.

Further, the erroneous feature quantity calculation value (FRFR) of the frames as active voice frames misjudged as non-active voice frames and the erroneous feature quantity calculation value (FAFR) of the frames as non-active voice frames misjudged as active voice frames can be calculated with ease by means of addition and division like those shown in the expressions (2) and (3). Therefore, the weights of multiple feature quantities can be updated with a smaller number of calculations compared to the method employing a discrimination function disclosed in the Patent Document 2.

While the $FRFR_k$ and $FAFR_k$ are defined as the values obtained by the expressions (2) and (3) in the above example, values obtained by different calculations may also be employed as the $FRFR_k$ and $FAFR_k$ in the present invention. For example, the erroneous feature quantity calculation value calculating unit 140 may also calculate the $FRFR_k$ and $FAFR_k$ for each type of feature quantity by use of the following expressions (14) and (15):

$$FRFR_k \equiv \Sigma_{t \in ACTIVE\ VOICE}(f_{kt} \times (1 - \tan h[\gamma \times \alpha \times (F_t - \theta) \div (\text{the number of the detected active voice frames})])) \div (\text{the number of the detected active voice frames}) \div 2 \quad (14)$$

$$FAFR_k \equiv \Sigma_{t \in NON\text{-}ACTIVE\ VOICE}(f_{kt} \times (1 + \tan h[\gamma \times (1 - \alpha) \times (F_t - \theta) \div (\text{the number of the detected non-active voice frames})])) \div (\text{the number of the detected non-active voice frames}) \div 2 \quad (15)$$

In the expression (14), "t∈ACTIVE VOICE" means frames whose labels represent active voice frames. In the expression (15), "t∈NON-ACTIVE VOICE" means frames whose labels represent non-active voice frames.

In the expressions (14) and (15), "γ" is a parameter representing the degree of reliability. The expression (14) approaches the expression (2) and the expression (15) approaches the expression (3) as the value of γ is increased. The expressions (14) and (15) coincide with the expressions (2) and (3), respectively when the parameter γ is infinite. It is possible, for example, to set the parameter γ at a low value in the initial stage of the learning and gradually increase the parameter γ with the progress of the learning. Specifically, while the loop process of the steps S101-S108 is repeated as shown in FIG. 3, it is possible to keep the γ value low in the stage with a small number of repetitions of the loop process and gradually increase the γ value with the increase in the number of repetitions of the loop process. It is also possible to set the γ value low when the amount of the learning data (sample data) is small and set the γ value high when the amount of the learning data is large.

Second Embodiment

Figure 5:
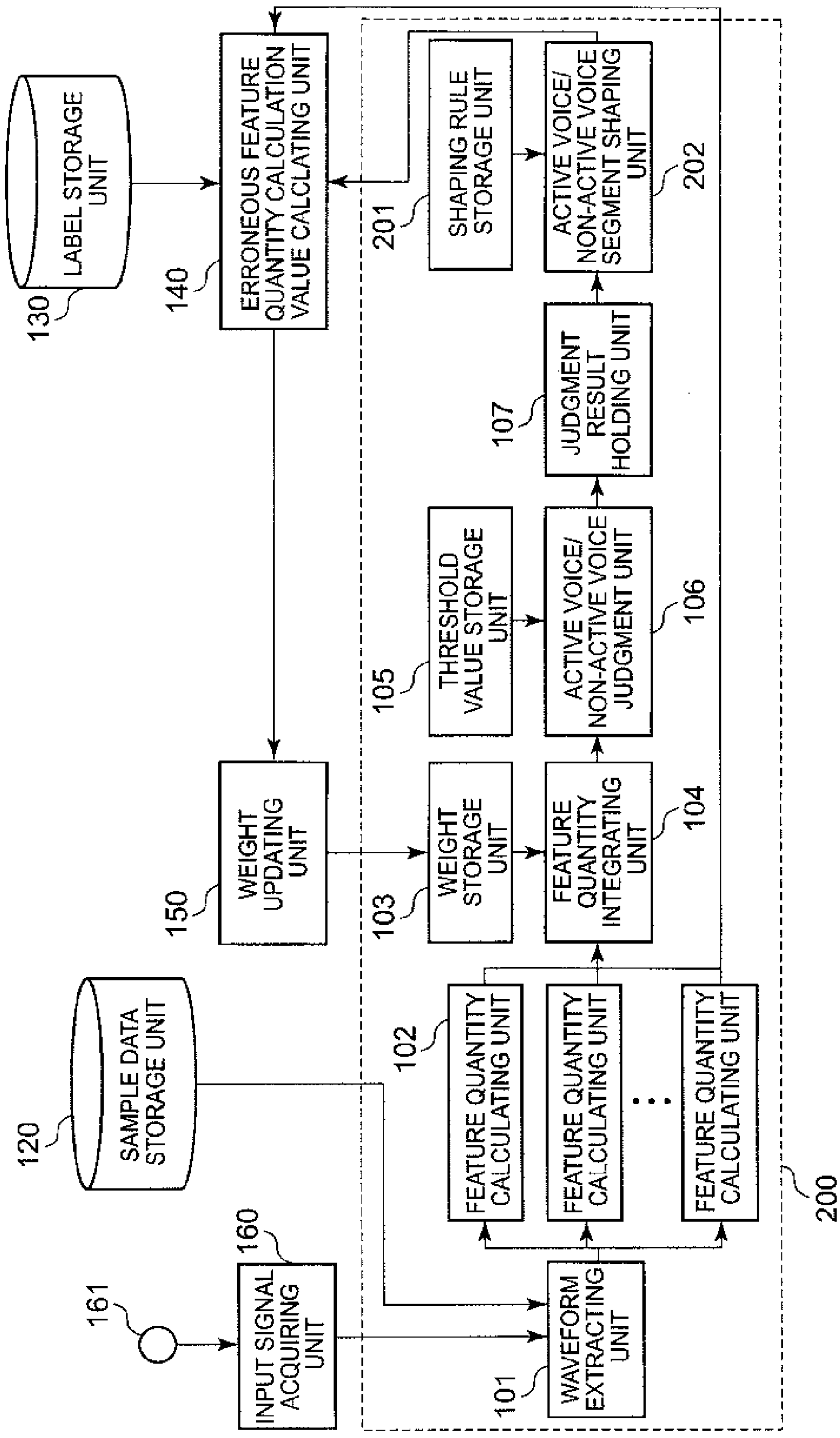
FIG. 5 It depicts a block diagram showing an example of the configuration of a voice activity detector in accordance with a second embodiment of the present invention.

FIG. 5 is a block diagram showing an example of the configuration of a voice activity detector in accordance with a second embodiment of the present invention, wherein components equivalent to those in the first embodiment are assigned the same reference characters as those in FIG. 1 and repeated explanation thereof is omitted for brevity. The voice activity detector of the second embodiment includes a voice activity detection unit 200 instead of the voice activity detection unit 100 in the first embodiment. The voice activity detection unit 200 includes a shaping rule storage unit 201 and an active voice/non-active voice segment shaping unit 202 in addition to the waveform extracting unit 101, the feature quantity calculating unit 102, the weight storage unit 103, the feature quantity integrating unit 104, the threshold value storage unit 105, the active voice/non-active voice judgment unit 106 and the judgment result holding unit 107.

The shaping rule storage unit 201 is a storage device for storing rules for shaping the result of the judgment between active voice segments and non-active voice segments across a plurality of frames. The shaping rule storage unit 201 may store the following rules, for example:

The first rule is a rule specifying that "an active voice segment shorter than an active voice duration threshold is regarded as a non-active voice segment". The second rule is a rule specifying that "a non-active voice segment shorter than a non-active voice duration threshold is regarded as an active voice segment". The third rule is a rule specifying that "starting/finishing end margins are given to the front and rear ends (starting/finishing ends) of an active voice segment". The active voice duration threshold and the non-active voice duration threshold may be set previously.

The shaping rule storage unit 201 may store part of the above rules (without storing all of the above rules) or further store rules other than the above rules.

The active voice/non-active voice segment shaping unit 202 shapes the judgment result across a plurality of frames according to the rules stored in the shaping rule storage unit 201. The active voice/non-active voice segment shaping unit 202 may be implemented, for example, by a CPU operating according to a program, or as hardware separate from the other components.

Figure 6:
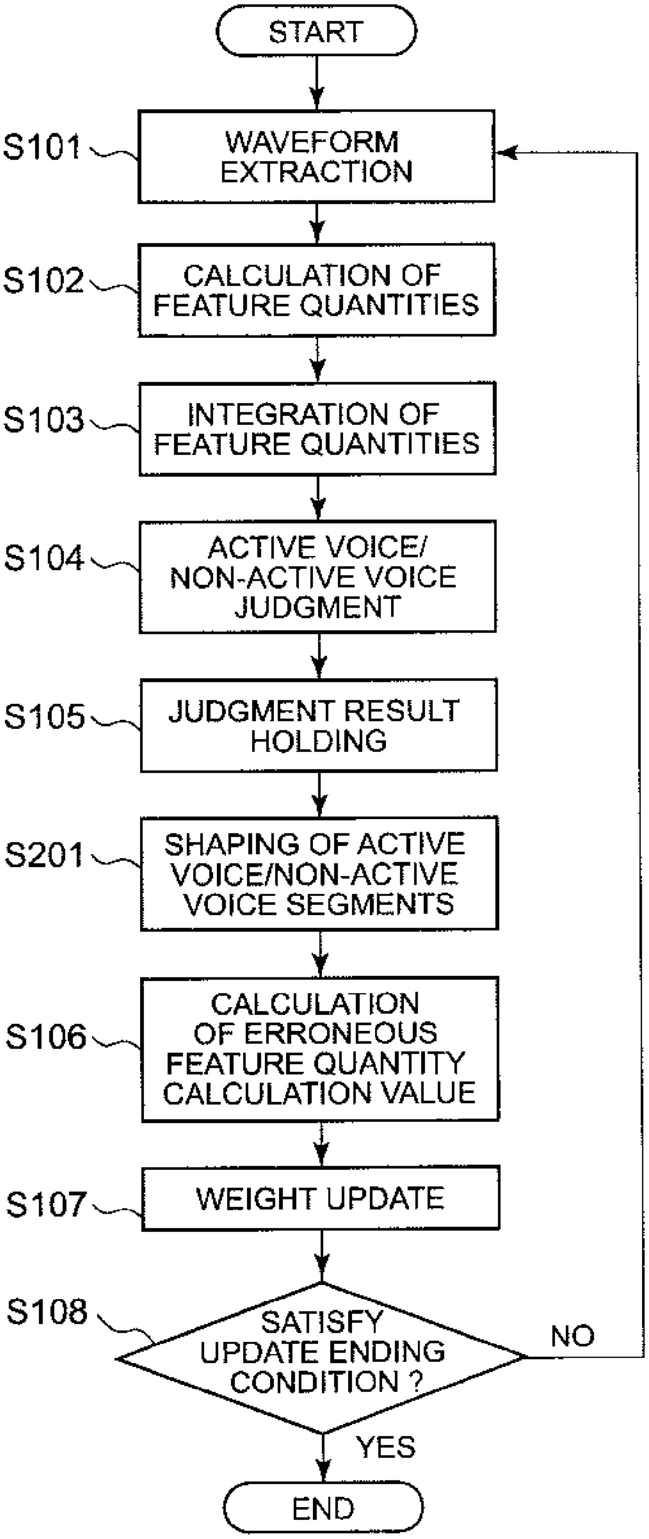
FIG. 6 It depicts a flow chart showing an example of the progress of the weight learning process in the second embodiment.

Next, the operation of the second embodiment will be explained. FIG. 6 is a flow chart showing an example of the progress of the weight learning process in the second embodiment, wherein steps equivalent to those in the first embodiment are assigned the same reference characters as those in FIG. 3 and repeated explanation thereof is omitted. The operation till the judgment on whether each frame corresponds to an active voice frame or a non-active voice frame is made and the judgment result is held in the judgment result holding unit 107 is identical with the operation in the steps S101-S105 in the first embodiment.

In response to the holding of the judgment result from the active voice/non-active voice judgment unit 106 by the judgment result holding unit 107, the active voice/non-active voice segment shaping unit 202 shapes the judgment result across a plurality of frames (judgment result on whether each frame is an active voice segment or a non-active voice segment) held by the judgment result holding unit 107 according to the rules stored in the shaping rule storage unit 201 (step S201). When the first rule has been stored, for example, the active voice/non-active voice segment shaping unit 202 changes each active voice segment shorter than the active voice duration threshold into a non-active voice segment. Specifically, if the number (duration) of consecutive frames judged as active voice frames is less than the active voice duration threshold, the active voice segment is changed into a non-active voice segment. When the second rule has been stored, for example, if the number (duration) of consecutive frames judged as non-active voice frames is less than the non-active voice duration threshold, the non-active voice segment is changed into an active voice segment. When the third rule has been stored, for example, the starting/finishing end margins are added to the front and rear ends of each active voice segment. These shaping procedures may also be executed more than once.

In the step S106 after the step S201, the erroneous feature quantity calculation value calculating unit 140 calculates the erroneous feature quantity calculation values using the judgment result after undergoing the shaping by the active voice/non-active voice segment shaping unit 202. As above, the shaping process (step S201) is inserted between the steps S105 and S106 in the second embodiment. The other operation is similar to that in the first embodiment.

Also in the operation for executing the voice activity detection to the inputted sound signal using the weights of the multiple feature quantities obtained by the learning, the step S201 is desired to be executed between the steps S105 and S106. The input signal acquiring unit 160 acquires the analog signal of the voice as the target of the judgment (discrimination) between active voice frames and non-active voice frames, converts the analog signal into the digital signal, and inputs the digital signal to the voice activity detection unit 200. Upon input of the sound signal, the voice activity detection unit 200 executes a process similar to the steps S101-S201 (see FIG. 6) to the sound signal and uses the judgment result shaped by the step S201 as the output data.

Next, the effect of this embodiment will be explained.

This embodiment also achieves effects similar to those of the first embodiment. Further, by executing the shaping to the active voice/non-active voice judgment result of each frame according to the frame shaping rules, errors such as upwelling of short active voices and loss of short active voices can be reduced. While it is possible to employ the operation of the first embodiment for the learning of the weights of the feature quantities and execute the process including the step S201 for the voice activity detection of the input signal as the target, the shaping according to the frame shaping rules causes a change in the rate between the tendency to misjudge an active voice frame as a non-active voice frame and the tendency to misjudge a non-active voice frame as an active voice frame. However, by executing the shaping (step S201) also in the learning of the weights of the feature quantities as in this embodiment, the weights of the feature quantities can be updated by use of the error tendency of the voice activity detection result obtained by employing the frame shaping rules as well. Consequently, the weight update can be executed while maintaining the rate between the tendency to misjudge an active voice frame as a non-active voice frame and the tendency to misjudge a non-active voice frame as an active voice frame at a constant rate even when the frame shaping rules are applied.

Third Embodiment

Figure 7:
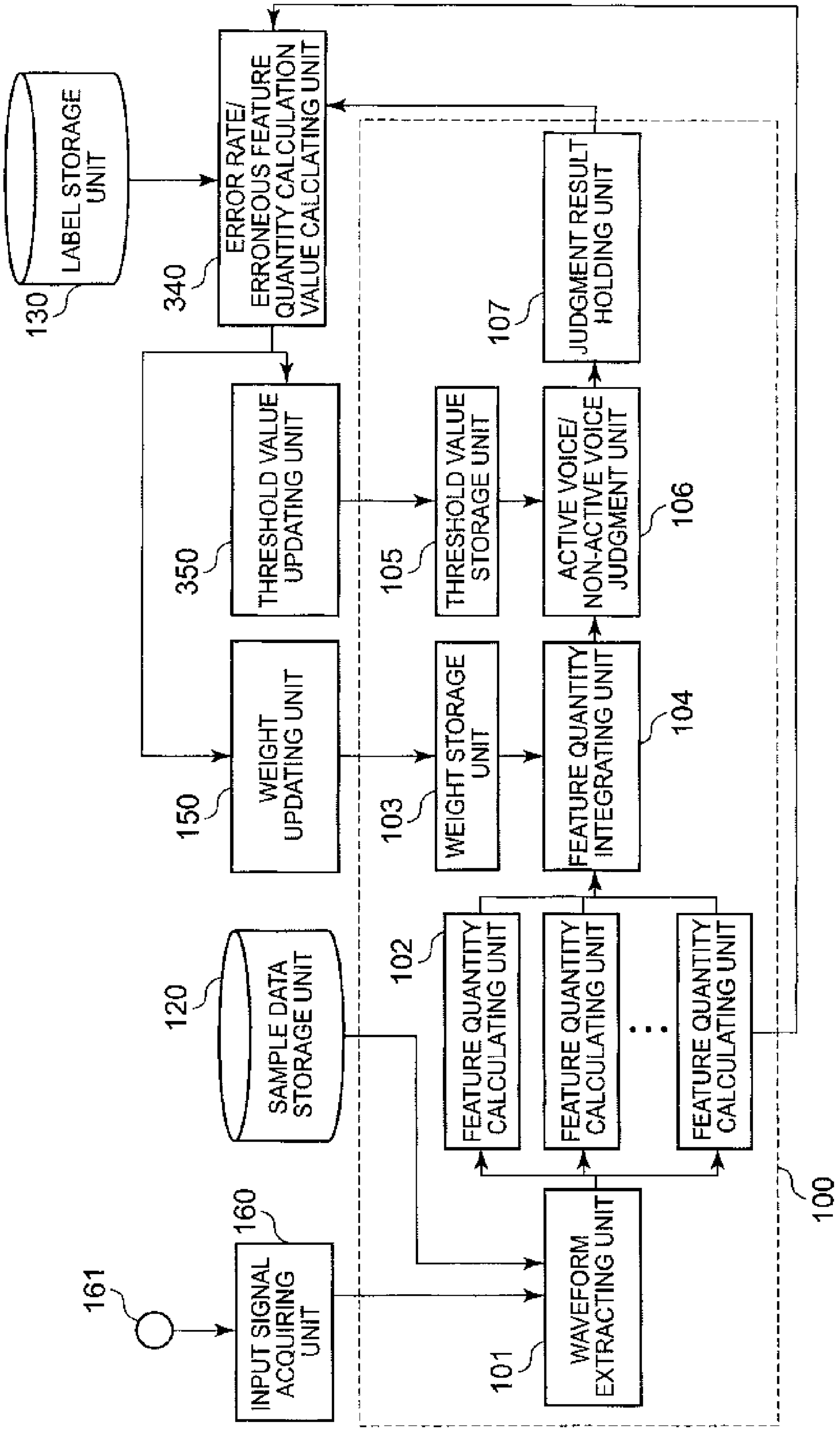
FIG. 7 It depicts a block diagram showing an example of the configuration of a voice activity detector in accordance with a third embodiment of the present invention.

FIG. 7 is a block diagram showing an example of the configuration of a voice activity detector in accordance with a third embodiment of the present invention, wherein components equivalent to those in the first embodiment are assigned the same reference characters as those in FIG. 1 and repeated explanation thereof is omitted. The voice activity detector of the third embodiment includes an error rate/erroneous feature quantity calculation value calculating unit 340 instead of the erroneous feature quantity calculation value calculating unit 140 in the first embodiment and further includes a threshold value updating unit 350.

The error rate/erroneous feature quantity calculation value calculating unit 340 calculates not only the erroneous feature quantity calculation values ($FAFR_k$, $FRFR_k$) but also error rates. The error rate/erroneous feature quantity calculation value calculating unit 340 calculates the rate of misjudging an active voice frame as a non-active voice frame (FRR: False Rejection Ratio) and the rate of misjudging a non-active voice frame as an active voice frame (FAR: False Acceptance Ratio) as the error rates.

The threshold value updating unit 350 updates the judgment threshold value θ stored in the threshold value storage unit 105 based on the error ratios.

The error rate/erroneous feature quantity calculation value calculating unit 340 and the threshold value updating unit 350 may be implemented, for example, by a CPU operating according to a program, or as hardware separate from the other components.

Next, the operation of the third embodiment will be explained. The process for the weight learning will be explained referring to the flow chart of FIG. 3. The process till the judgment is made by the active voice/non-active voice judgment unit 106 and the judgment result is held in the judgment result holding unit 107 (steps S101-S105) is identical with that in the first embodiment.

In the next step S106, the error rate/erroneous feature quantity calculation value calculating unit 340 calculates the erroneous feature quantity calculation values ($FAFR_k$, $FRFR_k$) similarly to the first embodiment and further calculates the error rates (FRR, FAR). The error rate/erroneous feature quantity calculation value calculating unit 340 calculates the FRR (the rate of misjudging an active voice frame as a non-active voice frame) according to the following expression (16):

$$FRR \equiv (\text{the number of active voice frames misjudged as non-active voice frames}) \div (\text{the number of the detected active voice frames}) \quad (16)$$

Meanwhile, the error rate/erroneous feature quantity calculation value calculating unit 340 calculates the FAR (the rate of misjudging a non-active voice frame as an active voice frame) according to the following expression (17):

$$FAR \equiv (\text{the number of non-active voice frames misjudged as active voice frames}) \div (\text{the number of the detected non-active voice frames}) \quad (17)$$

The "number of active voice frames misjudged as non-active voice frames" means the number of frames (included in the plurality of frames for which the judgment result is held) misjudged as non-active voice frames in contradiction to their labels representing active voice frames. The "number of non-active voice frames misjudged as active voice frames" means the number of frames (included in the plurality of frames for which the judgment result is held) misjudged as active voice frames in contradiction to their labels representing non-active voice frames.

In the next step S107, the weight updating unit 150 updates the weights stored in the weight storage unit 103 similarly to the first embodiment. In this embodiment, the threshold value updating unit 350 further updates the judgment threshold value θ stored in the threshold value storage unit 105 using the error rates (FRR, FAR). The threshold value updating unit 350 may update the judgment threshold value θ according to the following expression (18):

$$\theta \leftarrow \theta - \epsilon' \times (\alpha \times FRR - (1-\alpha) \times FAR) \quad (18)$$

In the expression (18), "θ" on the left side represents the judgment threshold value after the update and "θ" on the right side represents the judgment threshold value before the update. Thus, the threshold value updating unit 350 may calculate θ−ε'×(α×FRR−(1−α)×FAR) using θ before the update and then regard the calculation result as θ after the update.

The parameter ε' in the expression (18) represents the step size of the update, that is, a value specifying the magnitude of the update. The parameter ε' may be set at the same value as ε, or changed from ε. The parameter α in the expression (18) is desired to be set at the same value as α in the expression (4).

After the step S107, whether the update ending condition is satisfied or not is judged (step S108) and the process from the step S101 is repeated when the condition is not satisfied. In this case, the judgment in the step S104 is made using 8 after the update.

In the loop process of the steps S101-108, both the weights and the judgment threshold value may be updated in the step S107 each time, or the update of the weights and the update of the judgment threshold value may be executed alternately in the repetition of the loop process. It is also possible to repeat the process (steps S101-108) in regard to the weights or the judgment threshold value until the update ending condition is satisfied, and thereafter repeat the process (steps S101-108) in regard to the other until the update ending condition is satisfied.

As the update process represented by the expression (18) is executed multiple times, the rate between the two error rates approaches the rate indicated by the following expression (19):

$$FAR_k : FRR_k = \alpha : 1-\alpha \quad (19)$$

The operation for executing the voice activity detection to the input signal using the weights of the multiple feature quantities obtained by the learning is similar to that in the first embodiment. In this embodiment in which the judgment threshold value θ has also been learned, the judgment (discrimination) between active voice frames and non-active voice frames is made by comparing the integrated feature quantity $F_t$ with the learned θ.

Next, the effect of this embodiment will be explained.

In this embodiment, the weights of the multiple feature quantities and the judgment threshold value are updated so that the error rates decrease under the condition that the rate between the error rates approaches a preset rate. By previously setting the value of α, the threshold value is properly updated so as to implement voice activity detection that satisfies the expected rate between the two error rates FRR and FAR. The voice activity detection is used for various purposes. The appropriate rate between the two error rates FRR and FAR is expected to vary depending on the purpose of use. By this embodiment, the rate between the error rates can be set at an appropriate rate suitable for the purpose of use.

In the third embodiment, the voice activity detection unit may also be equipped with the shaping rule storage unit 201 and the active voice/non-active voice segment shaping unit 202 (see FIG. 5) and execute the shaping of the judgment result based on the rules similarly to the second embodiment.

Fourth Embodiment

Figure 8:
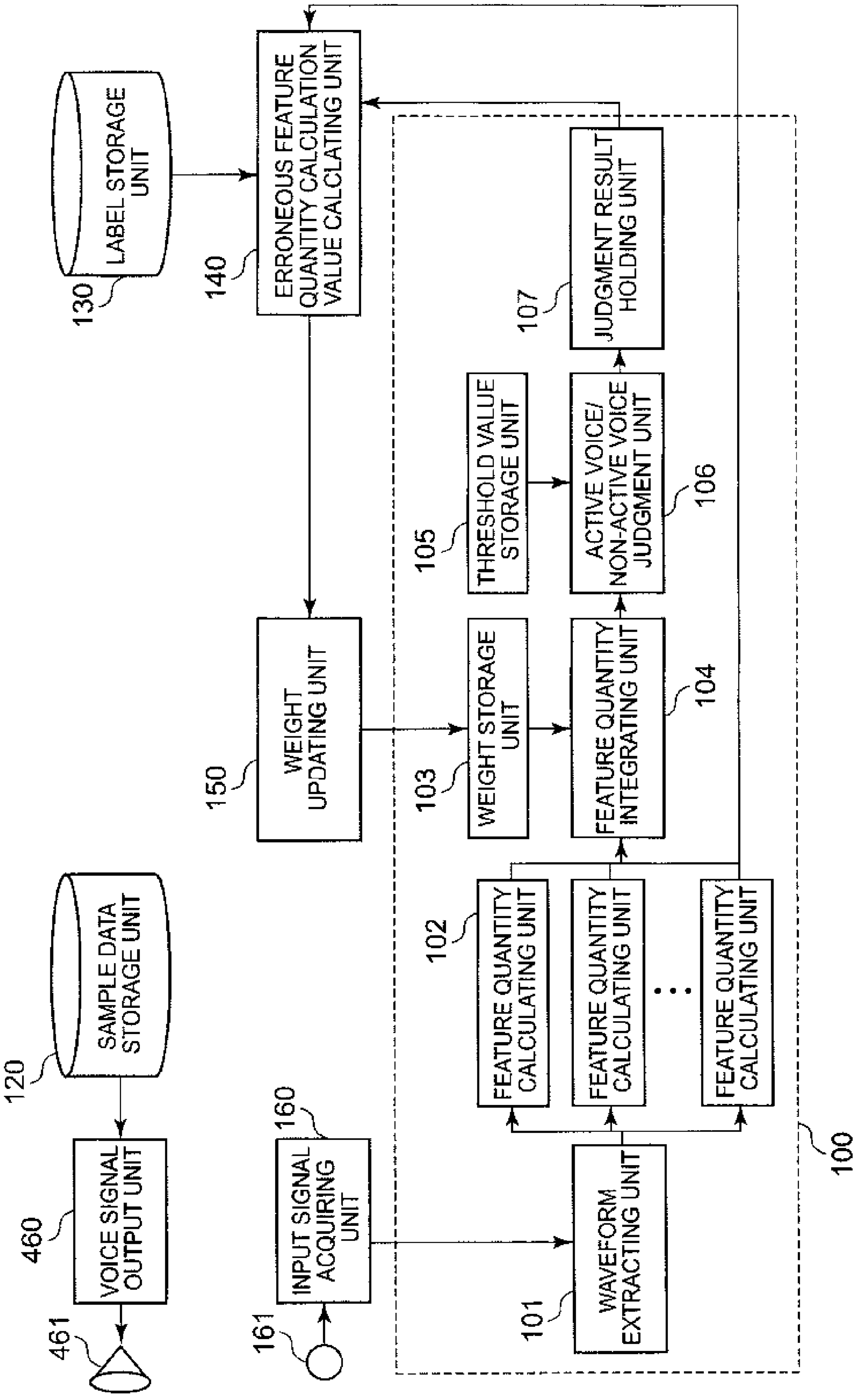
FIG. 8 It depicts a block diagram showing an example of the configuration of a voice activity detector in accordance with a fourth embodiment of the present invention.

In the first through third embodiments, the sample data stored in the sample data storage unit 120 was directly used as the input to the waveform extracting unit 101. In the fourth embodiment, the sample data is outputted as sound. The sound is inputted, converted into a digital signal, and used as the input to the waveform extracting unit 101. FIG. 8 is a block diagram showing an example of the configuration of a voice activity detector in accordance with a fourth embodiment of the present invention, wherein components equivalent to those in the first embodiment are assigned the same reference characters as those in FIG. 1 and repeated explanation thereof is omitted. The voice activity detector of the fourth embodiment includes a sound signal output unit 460 and a speaker 461 in addition to the configuration of the first embodiment.

The sound signal output unit 460 makes the speaker 461 output the sample data stored in the sample data storage unit 120 as sound. The sound signal output unit 460 is implemented by, for example, a CPU operating according to a program.

In this embodiment, the sound signal output unit 460 makes the speaker 461 output the sample data as sound in the step S101 in the weight learning. In this case, the microphone 161 is arranged at a position where the sound outputted by the speaker 461 can be inputted. Upon input of the sound, the microphone 161 converts the sound into an analog signal and inputs the analog signal to the input signal acquiring unit 160. The input signal acquiring unit 160 converts the analog signal to a digital signal and inputs the digital signal to the waveform extracting unit 101. The waveform extracting unit 101 extracts the waveform data of the frames from the digital signal. The other operation is similar to that in the first embodiment.

By this embodiment, noise in the ambient environment surrounding the voice activity detector is also inputted when the sound of the sample data is inputted, by which the weight learning is conducted in the state also including the environmental noise (ambient noise). Therefore, the weights can be appropriately set at values suitable for the noise environment where the sound is actually inputted.

In the fourth embodiment, the voice activity detection unit may also be equipped with the shaping rule storage unit 201 and the active voice/non-active voice segment shaping unit 202 (see FIG. 5) and execute the shaping of the judgment result based on the rules similarly to the second embodiment. Further, the voice activity detector of the fourth embodiment may also be configured to include the error rate/erroneous feature quantity calculation value calculating unit 340 (instead of the erroneous feature quantity calculation value calculating unit 140) and the threshold value updating unit 350

(see FIG. 7) and thereby also learn the judgment threshold value θ similarly to the third embodiment.

Fifth Embodiment

Figure 9:
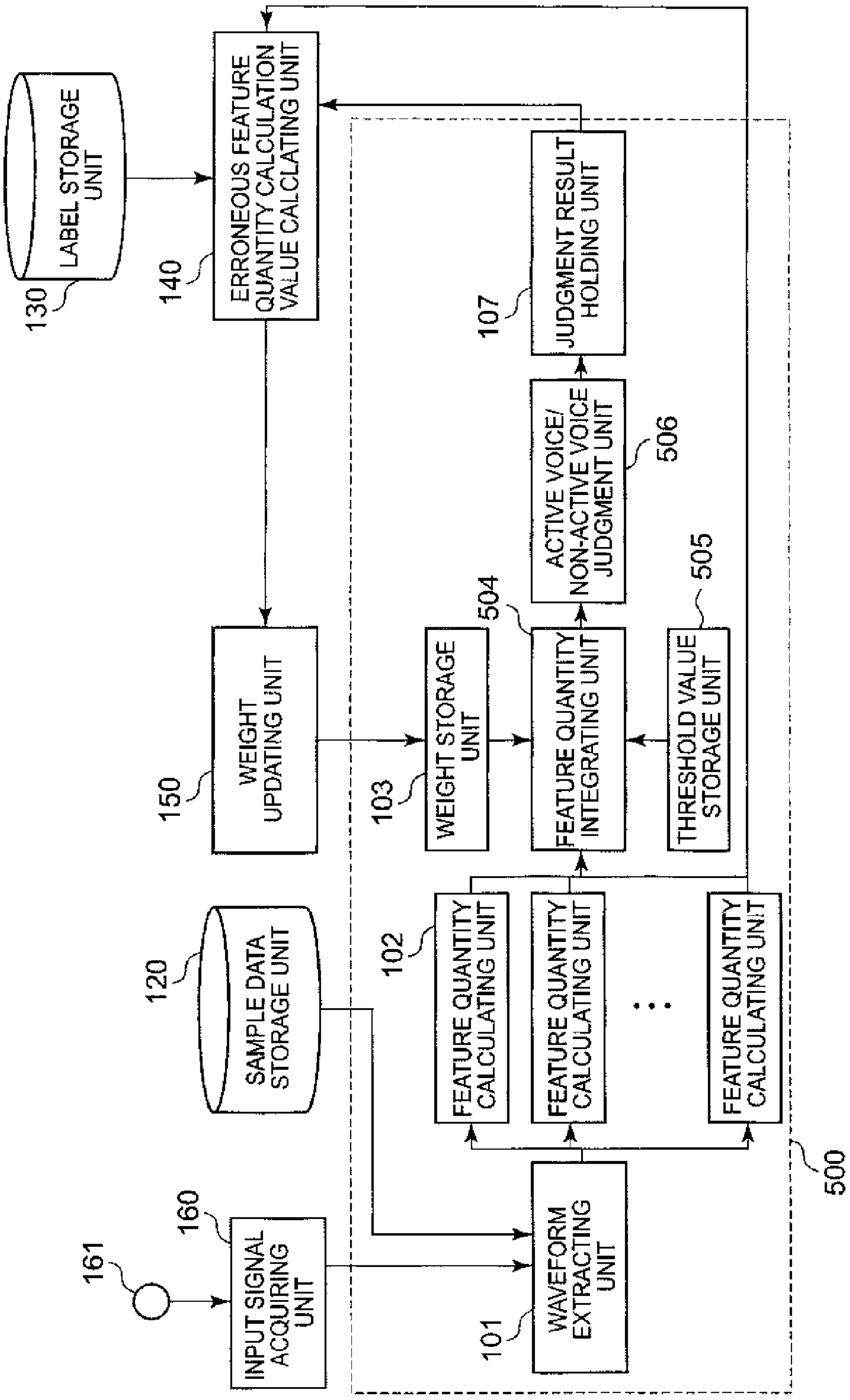
FIG. 9 It depicts a block diagram showing an example of the configuration of a voice activity detector in accordance with a fifth embodiment of the present invention.

FIG. 9 is a block diagram showing an example of the configuration of a voice activity detector in accordance with a fifth embodiment of the present invention, wherein components equivalent to those in the first embodiment are assigned the same reference characters as those in FIG. 1 and repeated explanation thereof is omitted. The voice activity detector of the fifth embodiment includes a voice activity detection unit 500 instead of the voice activity detection unit 100 in the first embodiment. The voice activity detection unit 500 includes the waveform extracting unit 101, the feature quantity calculating unit 102, the weight storage unit 103, a feature quantity integrating unit 504, a threshold value storage unit 505, an active voice/non-active voice judgment unit 506 and the judgment result holding unit 107. The waveform extracting unit 101, the feature quantity calculating unit 102, the weight storage unit 103 and the judgment result holding unit 107 are similar to those in the first embodiment.

The threshold value storage unit 505 stores threshold values corresponding to the multiple feature quantities, respectively. These threshold values, as threshold values used when the judgment (discrimination) between active voice frames and non-active voice frames is made using only one feature quantity, for example, will hereinafter be referred to as "individual threshold values" in order to discriminate them from the judgment threshold value θ used as the target of the comparison with the integrated feature quantity $F_t$. The individual threshold values are represented as "$\theta_k$", where "k" is the subscript for each feature quantity.

The feature quantity integrating unit 504 calculates the integrated feature quantity by integrating the feature quantities using the individual threshold values stored in the threshold value storage unit 505 and the weights stored in the weight updating unit 150. Specifically, the feature quantity integrating unit 504 calculates the integrated feature quantity by calculating the difference between each feature quantity and the corresponding individual threshold value and weighting each difference.

The active voice/non-active voice judgment unit 506 judges whether the waveform data of each frame is an active voice frame or a non-active voice frame based on the integrated feature quantity calculated by the feature quantity integrating unit 504. In this embodiment, the judgment threshold value θ is set at 0 (θ=0). In this example, each frame is judged as an active voice frame if the integrated feature quantity is greater than 0 (judgment threshold value) and as a non-active voice frame otherwise, for example. The active voice/non-active voice judgment unit 506 makes the judgment result holding unit 107 store the judgment result across a plurality of frames.

The feature quantity integrating unit 504 and the active voice/non-active voice judgment unit 506 may be implemented, for example, by a CPU operating according to a program, or as hardware separate from the other components. The threshold value storage unit 505 is implemented by a storage device, for example.

Next, the operation of the fifth embodiment will be explained. The process for the weight learning will be explained referring to the flow chart of FIG. 3. The process till the calculation of the feature quantities (steps S101 and S102) is identical with that in the first embodiment.

In the next step S103, the feature quantity integrating unit 504 calculates the integrated feature quantity by integrating the multiple feature quantities according to the following expression (20):

$$F_t=\Sigma_k w_k\times(f_{kt}-\theta_k) \tag{20}$$

Specifically, the difference between the feature quantity and the individual threshold value $\theta_k$ is calculated for each feature quantity and then the total sum of the product of the difference $(f_{kt}-\theta_k)$ and the corresponding weight is calculated.

In the next step S104, the active voice/non-active voice judgment unit 506 judges that the frame t is an active voice frame if the integrated feature quantity $F_t$ calculated by the feature quantity integrating unit 504 is greater than 0, while judging that the frame t is a non-active voice frame if $F_t$ is 0 or less. In short, the judgment is made by using the judgment threshold value θ=0. The operation after the step S105 is similar to that in the first embodiment. Incidentally, in cases where the $FRFR_k$ and $FAFR_k$ are calculated using the expressions (14) and (15) instead of the expressions (2) and (3), θ in the expressions (14) and (15) should be set at 0.

When the judgment process for an inputted sound signal is executed after the weight learning, the judgment process may be implemented by executing the process of the steps S101-S105. Also in this case, the integrated feature quantity is calculated according to the expression (20) in the step S103 and the judgment using the judgment threshold value θ=0 is made in the step S104.

By this embodiment in which a threshold value can be prepared for each feature quantity, a voice activity detector having higher judgment performance can be realized.

In the fifth embodiment, the voice activity detection unit may also be equipped with the shaping rule storage unit 201 and the active voice/non-active voice segment shaping unit 202 (see FIG. 5) and execute the shaping of the judgment result based on the rules similarly to the second embodiment. Further, the voice activity detector of the fifth embodiment may also be configured to include the sound signal output unit 460 and the speaker 461, output the sample data as sound, receive the sound as input, convert the inputted sound into a digital signal and use the digital signal as the input to the waveform extracting unit 101 similarly to the fourth embodiment.

Further, the voice activity detector of the fifth embodiment may also be configured to include the error rate/erroneous feature quantity calculation value calculating unit 340 (instead of the erroneous feature quantity calculation value calculating unit 140) and the threshold value updating unit 350 (see FIG. 7) and thereby also learn the judgment threshold value A similarly to the third embodiment. In this case, the error rate/erroneous feature quantity calculation value calculating unit 340 may calculate the error rates FRR and FAR according to the expressions (16) and (17) similarly to the third embodiment. However, the threshold value updating unit 350 updates the individual threshold values according to the following expression (21) instead of the expression (18).

$$\theta k\leftarrow\theta_k-\epsilon'\times w_k\times(\alpha\times FRR-(1-\alpha)\times FAR) \tag{21}$$

In the expression (21), "$\theta_k$" on the left side represents the individual threshold value after the update and "$\theta_k$" on the right side represents the judgment threshold value before the update. Thus, the threshold value updating unit 350 calculates $\theta_k-\epsilon'\times(\alpha\times FRR-(1-\alpha)\times FAR)$ using $\theta_k$ before the update and then updates each $\theta_k$ stored in the threshold value storage unit 505 using the calculation result as $\theta_k$ after the update.

The output results (judgment results for the inputted voice) obtained in the first through fifth embodiments are used by, for example, sound recognition devices (voice recognition devices) and devices for voice transmission.

While each frame is judged to correspond to an active voice frame if the integrated feature quantity is greater than the judgment threshold value and otherwise judged to correspond to a non-active voice frame in the above embodiments, there are also cases where each frame is judged to correspond to an active voice frame if the integrated feature quantity is less than the judgment threshold value and otherwise judged to correspond to a non-active voice frame.

In this case, the erroneous feature quantity calculation value calculating unit 140 calculates the erroneous feature quantity calculation values $FRFR_k$ and $FAFR_k$ according to the following expressions (22) and (23) instead of the expressions (2) and (3).

$$FRFR_k = \Sigma_{t\in FR}(-f_{kt}) \div (\text{the number of the detected active voice frames}) \quad (22)$$

$$FAFR_k = \Sigma_{t\in FA}(-f_{kt}) \div (\text{the number of the detected non-active voice frames}) \quad (23)$$

The $FRFR_k$ and $FAFR_k$ may also be calculated according to the following expressions (24) and (25) instead of the expressions (14) and (15).

$$FRFR_k = \Sigma_{t\in ACTIVE\ VOICE}(f_{kt} \times (1 - \tan h[\gamma \times \alpha \times (\theta - F_t) \div (\text{the number of the detected active voice frames})])) \div (\text{the number of the detected active voice frames}) \div 2 \quad (24)$$

$$FAFR_k = \Sigma t_{\in NON\text{-}ACTIVE\ VOICE}(f_{kt} \times (1 + \tan h[\gamma \times (1-\alpha) \times (\theta - F_t) \div (\text{the number of the detected non-active voice frames})])) \div (\text{the number of the detected non-active voice frames}) \div 2 \quad (25)$$

In the case where each frame is judged to correspond to an active voice frame if the integrated feature quantity is less than the judgment threshold value and otherwise judged to correspond to a non-active voice frame, the threshold value updating unit 350 may update the judgment threshold value θ according to the following expression (26) instead of the expression (18).

$$\theta \leftarrow \theta + \epsilon' \times (\alpha \times FRR - (1-\alpha) \times FAR) \quad (26)$$

When the update corresponding to the expression (21) is executed, the individual threshold values $\theta_k$ may be updated according to the following expression (27) instead of the expression (21).

$$\theta_k \leftarrow \theta_k + \epsilon' \times W_k \times (\alpha \times FRR - (1-\alpha) \times FAR) \quad (27)$$

Figure 10:
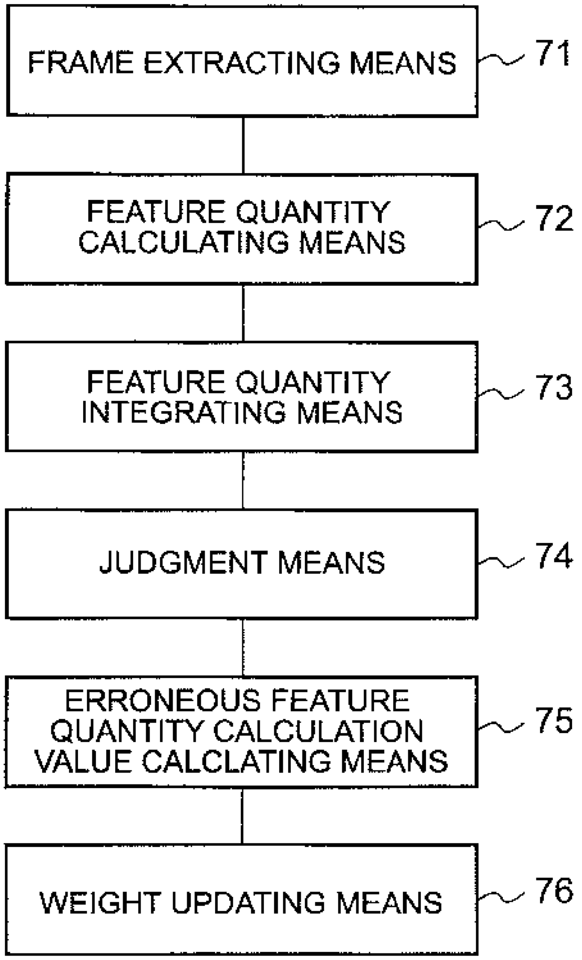
FIG. 10 It depicts a block diagram showing the general outline of the present invention.

In the following, the general outline of the present invention will be explained. FIG. 10 is a block diagram showing the general outline of the present invention. The voice activity detector in accordance with the present invention comprises frame extracting means 71 (e.g., the waveform extracting unit 101), feature quantity calculating means 72 (e.g., the feature quantity calculating unit 102), feature quantity integrating means 73 (e.g., the feature quantity integrating unit 104), judgment means 74 (e.g., the active voice/non-active voice judgment unit 106), erroneous feature quantity calculation value calculating means 75 (e.g., the erroneous feature quantity calculation value calculating unit 140) and weight updating means 76 (e.g., the weight updating unit 150).

The frame extracting means 71 extracts frames from an inputted sound signal. The feature quantity calculating means 72 calculates multiple feature quantities of each of the extracted frames. The feature quantity integrating means 73 calculates an integrated feature quantity as the integration of the multiple feature quantities by weighting the multiple feature quantities. The judgment means 74 judges whether each of the frames is an active voice frame or a non-active voice frame by comparing the integrated feature quantity with a threshold value (e.g., the judgment threshold value).

The frame extracting means 71 also extracts frames from sample data as voice data in which whether each frame is an active voice frame or a non-active voice frame is already known. The feature quantity calculating means 72 calculates the multiple feature quantities of each of the frames extracted from the sample data. The feature quantity integrating means 73 calculates the integrated feature quantity of the multiple feature quantities. The judgment means 74 judges whether each of the frames extracted from the sample data is an active voice frame or a non-active voice frame by comparing the integrated feature quantity with the threshold value.

The erroneous feature quantity calculation value calculating means 75 calculates a first erroneous feature quantity calculation value as an erroneous feature quantity calculation value regarding frames as active voice frames misjudged as non-active voice frames (e.g., $FRFR_k$) and a second erroneous feature quantity calculation value as an erroneous feature quantity calculation value regarding frames as non-active voice frames misjudged as active voice frames (e.g., $FAFR_k$) as erroneous feature quantity calculation values which are obtained by executing prescribed calculations to feature quantities of the sample data's frames whose judgment results by the judgment means 74 are erroneous.

The weight updating means 76 updates weights used by the feature quantity integrating means 73 for the weighting of the multiple feature quantities so that the rate between the first erroneous feature quantity calculation value and the second erroneous feature quantity calculation value approaches a prescribed value.

With such a configuration, the judgment (discrimination) between active voice frames and non-active voice frames can be made with high accuracy independently/irrespective of the unevenness between active voice frames and non-active voice frames included in the sample data.

The above embodiments have disclosed a configuration in which the erroneous feature quantity calculation value calculating means 75 calculates the first erroneous feature quantity calculation value by dividing the sum of feature quantities of frames as active voice frames misjudged as non-active voice frames by the number of frames correctly judged as active voice frames (e.g., the calculation of the expression (2)) and calculates the second erroneous feature quantity calculation value by dividing the sum of the feature quantities of frames as non-active voice frames misjudged as active voice frames by the number of frames correctly judged as non-active voice frames (e.g., the calculation of the expression (3)).

The above embodiments have also disclosed a configuration in which the erroneous feature quantity calculation value calculating means 75 calculates the sum $S_1$ of $f \times (1 - \tan h[\gamma \times \alpha \times (F - \theta) \div N_1])$ of frames previously determined as active voice frames in regard to each feature quantity and obtains $S_1 \div N_1 \div 2$ as the first erroneous feature quantity calculation value (e.g., the calculation of the expression (14)) and calculates the sum $S_2$ of $f \times (1 + \tan h[\gamma \times (1-\alpha) \times (F - \theta) \div N_2])$ of frames previously determined as non-active voice frames in regard to each feature quantity and obtains $S_2 \div N_2 \div 2$ as the second erroneous feature quantity calculation value (e.g., the calculation of the expression (15)), where "γ" is a parameter representing the degree of reliability of the judgment, "α" is a parameter specifying the rate between the first erroneous feature quantity calculation value and the second erroneous feature quantity calculation value, "θ" represents the threshold value as the target of the comparison with the integrated feature quantity, "f" represents the feature quantity, "F" represents the integrated feature quantity, "$N_1$" represents the number of frames correctly judged as active voice frames, and "$N_2$" represents the number of frames correctly judged as non-active voice frames.

The above embodiments have also disclosed a configuration in which the judgment means 74 judges that the frame extracted from the sample data is an active voice frame if a condition that the integrated feature quantity is greater than the threshold value is satisfied while judging that the frame is a non-active voice frame if the condition is not satisfied.

The above embodiments have also disclosed a configuration in which the erroneous feature quantity calculation value calculating means 75 calculates the first erroneous feature quantity calculation value by dividing the sum of sign-inverted feature quantities of frames as active voice frames misjudged as non-active voice frames by the number of frames correctly judged as active voice frames (e.g., the calculation of the expression (22)) and calculates the second erroneous feature quantity calculation value by dividing the sum of the sign-inverted feature quantities of frames as non-active voice frames misjudged as active voice frames by the number of frames correctly judged as non-active voice frames (e.g., the calculation of the expression (23)).

The above embodiments have also disclosed a configuration in which the erroneous feature quantity calculation value calculating means 75 calculates the sum $S_1$ of $f\times(1-\tan h[\gamma\times\alpha\times(\theta-F)\div N_1])$ of frames previously determined as active voice frames in regard to each feature quantity and obtains $S_1\div N_1\div 2$ as the first erroneous feature quantity calculation value (e.g., the calculation of the expression (24)) and calculates the sum $S_2$ of $f\times(1+\tan h[\gamma\times(1-\alpha)\times(\theta-F)\div N_2])$ of frames previously determined as non-active voice frames in regard to each feature quantity and obtains $S_2\div N_2\div 2$ as the second erroneous feature quantity calculation value (e.g., the calculation of the expression (25)), where "$\gamma$" is a parameter representing the degree of reliability of the judgment, "$\alpha$" is a parameter specifying the rate between the first erroneous feature quantity calculation value and the second erroneous feature quantity calculation value, "$\theta$" represents the threshold value as the target of the comparison with the integrated feature quantity, "f" represents the feature quantity, "F" represents the integrated feature quantity, "$N_1$" represents the number of frames correctly judged as active voice frames, and "$N_2$" represents the number of frames correctly judged as non-active voice frames.

The above embodiments have also disclosed a configuration in which the judgment means 74 judges that the frame extracted from the sample data is an active voice frame if a condition that the integrated feature quantity is less than the threshold value is satisfied while judging that the frame is a non-active voice frame if the condition is not satisfied.

The above embodiments have also disclosed a configuration in which the feature quantity integrating means 73 calculates the integrated feature quantity by calculating the difference between each feature quantity and an individual threshold value which has been set corresponding to the feature quantity and obtaining the sum of the product of the difference calculated for each feature quantity and a weight corresponding to the feature quantity, and the judgment means 74 makes the judgment on whether each frame is an active voice frame or a non-active voice frame by setting the threshold value as the target of the comparison with the integrated feature quantity at 0. With such a configuration, the accuracy of the judgment can be improved further.

The above embodiments have also disclosed a configuration further comprising: error rate calculating means (e.g., the error rate/erroneous feature quantity calculation value calculating unit 340) which calculates a first error rate of misjudging an active voice frame as a non-active voice frame (e.g., the FRR) and a second error rate of misjudging a non-active voice frame as an active voice frame (e.g., the FAR); and threshold value updating means (e.g., the threshold value updating unit 350) which updates the threshold value as the target of the comparison with the integrated feature quantity so that the rate between the first error rate and the second error rate approaches a prescribed value.

The above embodiments have also disclosed a configuration further comprising: error rate calculating means (e.g., the error rate/erroneous feature quantity calculation value calculating unit 340) which calculates a first error rate of misjudging an active voice frame as a non-active voice frame (e.g., the FRR) and a second error rate of misjudging a non-active voice frame as an active voice frame (e.g., the FAR); and threshold value updating means (e.g., the threshold value updating unit 350) which updates each individual threshold value so that the rate between the first error rate and the second error rate approaches a prescribed value.

The above embodiments have also disclosed a configuration further comprising: sound signal output means (e.g., the sound signal output unit 460) which causes the sample data to be outputted as sound; and sound signal input means (e.g., the microphone 161 and the input signal acquiring unit 160) which converts the sound into a sound signal and inputs the sound signal to the frame extracting means. With such a configuration, the weights can be appropriately set at values suitable for the actual noise environment.

The above embodiments have also disclosed a configuration further comprising: shaping rule storage means (e.g., the shaping rule storage unit 201) which stores a rule for shaping the judgment result by the judgment means 74; and judgment result shaping means (e.g., the active voice/non-active voice segment shaping unit 202) which shapes the judgment result by the judgment means 74 according to the rule. With such a configuration, errors such as upwelling of short active voice segment can be reduced thanks to the shaping of the judgment result.

The above embodiments have also disclosed a configuration in which the shaping rule storage means stores at least one rule selected from the following rules: a first rule specifying that an active voice segment whose duration is shorter than a prescribed length is regarded as a non-active voice segment; a second rule specifying that non-active voice segment whose duration is shorter than a prescribed length is regarded as an active voice segment; and a third rule specifying that a prescribed number of frames are added to front and rear ends of an active voice segment.

While the present invention has been described above with reference to the embodiments and examples, the present invention is not to be restricted to the particular illustrative embodiments and examples. A variety of modifications understandable to those skilled in the art can be made to the configuration and details of the present invention within the scope of the present invention.

This application claims priority to Japanese Patent Application No. 2008-321550 filed on Dec. 17, 2008, the entire disclosure of which is incorporated herein by reference.

INDUSTRIAL APPLICABILITY

The present invention is suitably applied to voice activity detectors for making the judgment between active voice frames and non-active voice frames for frames of a sound signal.

REFERENCE SIGNS LIST

101 waveform extracting unit
102 feature quantity calculating unit
103 weight storage unit
104 feature quantity integrating unit
105 threshold value storage unit
106 active voice/non-active voice judgment unit
107 judgment result holding unit
120 sample data storage unit
130 label storage unit
140 erroneous feature quantity calculation value calculating unit
150 weight updating unit
160 input signal acquiring unit
161 microphone
201 shaping rule storage unit
202 active voice/non-active voice segment shaping unit
340 error rate/erroneous feature quantity calculation value calculating unit
350 threshold value updating unit

The invention claimed is:

1. A voice activity detector comprising:

frame extracting unit which extracts frames from an inputted sound signal;

feature quantity calculating unit which calculates multiple feature quantities of each of the extracted frames;

feature quantity integrating unit which calculates an integrated feature quantity as integration of the multiple feature quantities by weighting the multiple feature quantities; and judgment unit which judges whether each of the frames is an active voice frame or a non-active voice frame by comparing the integrated feature quantity with a threshold value, wherein: the frame extracting unit extracts frames from sample data as voice data in which whether each frame is an active voice frame or a non-active voice frame is already known, and the feature quantity calculating unit calculates the multiple feature quantities of each of the frames extracted from the sample data, and the feature quantity integrating unit calculates the integrated feature quantity of the multiple feature quantities, and the judgment unit judges whether each of the frames extracted from the sample data is an active voice frame or a non-active voice frame by comparing the integrated feature quantity with the threshold value, and the voice activity detector further comprises:

false rejection feature quantity calculating unit which calculates feature quantity regarding false rejected frames, and false acceptance feature quantity calculating unit which calculates feature quantity regarding false accepted frames; and weight updating unit which updates weights used by the feature quantity integrating unit for the weighting of the multiple feature quantities so that the rate between the false rejection feature quantity calculating unit and the false acceptance feature quantity calculating unit approaches a prescribed value.

2. The voice activity detector according to claim 1, wherein: the false rejection feature quantity calculating unit calculates the false rejection feature quantity by dividing the sum of feature quantities of false rejected frames by the number of labeled active voice frames, and the false acceptance feature quantity calculating unit calculates the acceptance feature quantity by dividing the sum of feature quantities of false accepted frames by the number of labeled non-active voice frames.

3. The voice activity detector according to claim 1, wherein: the false rejection feature quantity calculating unit calculates the sum $S_1$ of $f\times(1-\tan h[\gamma\times\alpha\times(F-\theta)\div N_1])$ of frames previously labeled as active voice frames in regard to each feature quantity and obtains $S_1\div N_1\div 2$ as the false rejection feature quantity, and the false acceptance feature quantity calculating unit calculates the sum $S_2$ of $f\times(1+\tan h[\gamma\times(1-\alpha)\times(F-\theta)\div N_2])$ of frames previously labeled as non-active voice frames in regard to each feature quantity and obtains $S_2\div N_2\div 2$ as the false acceptance feature, where "$\gamma$" is a parameter representing the degree of reliability of the judgment, "$\alpha$" is a parameter specifying the rate between the false rejection feature quantity and the false acceptance feature quantity, "$\theta$" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

4. The voice activity detector according to claim 1, wherein the judgment unit judges that the frame extracted from the sample data is an active voice frame if a condition that the integrated feature quantity is greater than the threshold value is satisfied while judging that the frame is a non-active voice frame if the condition is not satisfied.

5. The voice activity detector according to claim 1, wherein: the false rejection feature quantity calculating unit calculates the false rejection feature quantity by dividing the sum of sign-inverted feature quantities of the false rejected frames by the number of the labeled active voice frames, and the false accepted feature quantity calculating unit calculates the false accepted feature quantity by dividing the sum of the sign-inverted feature quantities of the false accepted frames by the number of the labeled non-active voice frames.

6. The voice activity detector according to claim 1, wherein: the false rejection feature quantity calculating unit calculates the sum $S_1$ of $f\times(1-\tan h[\gamma\times\alpha\times(\theta-F)\div N_1])$ of frames previously labeled as active voice frames in regard to each feature quantity and obtains $S_1\div N_1\div 2$ as the false rejection feature quantity, and the false acceptance quantity calculating unit calculates the sum $S_2$ of $f\times(1+\tan h[\gamma\times(1-\alpha)\times(\theta-F)\div N_2])$ of frames previously labeled as non-active voice frames in regard to each feature quantity and obtains $S_2\div N_2\div 2$ as the false acceptance feature quantity, where "$\gamma$" is a parameter representing the degree of reliability of the judgment, "$\alpha$" is a parameter specifying the rate between the false rejection feature quantity and the false acceptance feature quantity, "$\theta$" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

7. The voice activity detector according to claim 1, wherein the judgment unit judges that the frame extracted from the sample data is an active voice frame if a condition that the integrated feature quantity is less than the threshold value is satisfied while judging that the frame is a non-active voice frame if the condition is not satisfied.

8. The voice activity detector according to claim 1, wherein: the feature quantity integrating unit calculates the integrated feature quantity by calculating the difference between each feature quantity and an individual threshold value which has been set corresponding to the feature quantity and obtaining the sum of the product of the difference calculated for each feature quantity and a weight corresponding to the feature quantity, and the judgment unit makes the judgment on whether each frame is an active voice frame or a non-active voice frame by setting the threshold value as the target of the comparison with the integrated feature quantity at 0.

9. The voice activity detector according to claim 1, further comprising:

error rate calculating unit which calculates a false rejection error rate of misjudging a labeled active voice frame as a non-active voice frame and a false acceptance error rate of misjudging a labeled non-active voice frame as an active voice frame; and threshold value updating unit which updates the threshold value as the target of the comparison with the integrated feature quantity so that the rate between the false rejection error rate and the false acceptance error rate approaches a prescribed value.

10. The voice activity detector according to claim 8, further comprising:

error rate calculating unit which calculates a false rejection error rate of misjudging a labeled active voice frame as a non-active voice frame and a false acceptance error rate of misjudging a labeled non-active voice frame as an active voice frame; and threshold value updating unit which updates each individual threshold value so that the rate between the false rejection error rate and the false acceptance error rate approaches a prescribed value.

11. The voice activity detector according to claim 1, further comprising:

sound signal output unit which causes the sample data to be outputted as sound; and sound signal input unit which converts the sound into a sound signal and inputs the sound signal to the frame extracting unit.

12. The voice activity detector according to claim 1, further comprising:

shaping rule storage unit which stores a rule for shaping the judgment result by the judgment unit; and judgment result shaping unit which shapes the judgment result by the judgment unit according to the rule.

13. The voice activity detector according to claim 12, wherein the shaping rule storage unit stores at least one rule selected from the following rules:

a first rule specifying that an active voice segment whose duration is shorter than a prescribed length is regarded as a non-active voice segment;

a second rule specifying that a non-active voice segment whose duration is shorter than a prescribed length is regarded as an active voice segment; and a third rule specifying that a prescribed number of frames are added to front and rear ends of an active voice segment.

14. A parameter adjusting method for adjusting parameters used by a voice activity detector which calculates multiple feature quantities of each of frames extracted from a sound signal, calculates an integrated feature quantity as integration of the multiple feature quantities by weighting the multiple feature quantities, and judges whether each of the frames is an active voice frame or a non-active voice frame by comparing the integrated feature quantity with a threshold value, comprising the steps of:

extracting frames from sample data as voice data in which whether each frame is an active voice frame or a non-active voice frame is already known;

calculating the multiple feature quantities of each of the frames extracted from the sample data;

calculating the integrated feature quantity of each of the frames extracted from the sample data by weighting the multiple feature quantities;

judging whether each of the frames extracted from the sample data is an active voice frame or a non-active voice frame by comparing the integrated feature quantity with the threshold value;

calculating feature quantity regarding false rejected frames;

calculating feature quantity regarding false accepted frames; and updating weights used for the weighting of the multiple feature quantities so that the rate between the false rejection feature quantity and the acceptance feature quantity approaches a prescribed value.

15. The parameter adjusting method according to claim 14, wherein: the false rejection feature quantity is calculated by dividing the sum of feature quantities of false rejected frames by the number of labeled active voice frames, and the acceptance feature quantity is calculated by dividing the sum of feature quantities of false accepted frames by the number of labeled non-active voice frames.

16. The parameter adjusting method according to claim 14, wherein: the sum $S_1$ of $f\times(1-\tan h[\gamma\times\alpha\times(F-\theta)\div N_1])$ of frames previously labeled as active voice frames is calculated in regard to each feature quantity and $S_1\div N_1\div 2$ is obtained as the false rejection feature quantity, and the sum $S_2$ of $f\times(1+\tan h[\gamma\times(1-\alpha)\times(F-\theta)\div N_2])$ of frames previously labeled as non-active voice frames is calculated in regard to each feature quantity and $S_2\div N_2\div 2$ is obtained as the false acceptance feature, where "$\gamma$" is a parameter representing the degree of reliability of the judgment, "$\alpha$" is a parameter specifying the rate between the false rejection feature quantity and the false acceptance feature quantity, "$\theta$" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

17. The parameter adjusting method according to claim 14, wherein: the false rejection feature quantity is calculated by dividing the sum of sign-inverted feature quantities of the false rejected frames by the number of the labeled active voice frames, and the false accepted feature quantity is calculated by dividing the sum of the sign-inverted feature quantities of the false accepted frames by the number of the labeled non-active voice frames.

18. The parameter adjusting method according to claim 14, wherein: the sum $S_1$ of f×(1−tan h[γ×α×(θ−F)÷$N_1$]) of frames previously labeled as active voice frames is calculated in regard to each feature quantity and $S_1$÷$N_1$÷2 is obtained as the false rejection feature quantity, and the sum $S_2$ of f×(1+tan h[γ×(1−α)×(θ−F)÷$N_2$]) of frames previously labeled as non-active voice frames is calculated in regard to each feature quantity and $S_2$÷$N_2$÷2 is obtained as the false acceptance feature quantity, where "γ" is a parameter representing the degree of reliability of the judgment, "α" is a parameter specifying the rate between the false rejection feature quantity and the false acceptance feature quantity, "θ" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

19. The parameter adjusting method according to claim 14, wherein: the integrated feature quantity is calculated by calculating the difference between each feature quantity and an individual threshold value which has been set corresponding to the feature quantity and obtaining the sum of the product of the difference calculated for each feature quantity and a weight corresponding to the feature quantity, and the judgment on whether each frame is an active voice frame or a non-active voice frame is made by setting the threshold value as the target of the comparison with the integrated feature quantity at 0.

20. The parameter adjusting method according to claim 14, further comprising the steps of:

calculating a false rejection error rate of misjudging a labeled active voice frame as a non-active voice frame and a false acceptance error rate of misjudging a labeled non-active voice frame as an active voice frame; and updating the threshold value as the target of the comparison with the integrated feature quantity so that the rate between the false rejection error rate and the false acceptance error rate approaches a prescribed value.

21. The parameter adjusting method according to claim 18, further comprising the steps of:

calculating a false rejection error rate of misjudging a labeled active voice frame as a non-active voice frame and a false acceptance error rate of misjudging a labeled non-active voice frame as an active voice frame; and updating each individual threshold value so that the rate between the false rejection error rate and the false acceptance error rate approaches a prescribed value.

22. A non-transitory computer readable information recording medium storing a voice activity detection program which, when executed by a processor, performs a method comprising:

a frame extracting process of extracting frames from an inputted sound signal;

a feature quantity calculating process of calculating multiple feature quantities of each of the extracted frames;

a feature quantity integrating process of calculating an integrated feature quantity as integration of the multiple feature quantities by weighting the multiple feature quantities; and a judgment process of judging whether each of the frames is an active voice frame or a non-active voice frame by comparing the integrated feature quantity with a threshold value, wherein the method further comprises: executing the frame extracting process to sample data as voice data in which whether each frame is an active voice frame or a non-active voice frame is already known, executing the feature quantity calculating process to each of the frames extracted from the sample data, and executing the feature quantity integrating process to the multiple feature quantities of each of the frames extracted from the sample data, and executing the judgment process to the integrated feature quantity calculated in the feature quantity integrating process, and wherein the method further comprises:

a false rejection feature quantity calculating process of calculating feature quantity regarding false rejected frames;

a false acceptance feature quantity calculating process of calculating feature quantity regarding false accepted frames; and a weight updating process of updating weights used for the weighting of the multiple feature quantities so that the rate between the false rejection feature quantity and the false acceptance feature quantity approaches a prescribed value.

23. The non-transitory computer readable information recording medium according to claim 22, wherein: the false rejection feature quantity calculating process calculates the false rejection feature quantity by dividing the sum of feature quantities of false rejected frames by the number of labeled active voice frames, and the false acceptance feature quantity calculating process calculates the acceptance feature quantity by dividing the sum of feature quantities of false accepted frames by the number of labeled non-active voice frames.

24. The non-transitory computer readable information recording medium according to claim 22, wherein: the false rejection feature quantity calculating process calculates the sum $S_1$ of f×(1−tan h[γ×α×(F−θ)+$N_1$]) of frames previously labeled as active voice frames in regard to each feature quantity and obtains $S_1$÷$N_{b+2}$ as the false rejection feature quantity, and the false acceptance feature quantity calculating process calculates the sum $S_2$ of f×(1+tan h[γ×(1−α)×(F−θ)+$N_2$]) of frames previously labeled as non-active voice frames in regard to each feature quantity and obtains $S_2$÷$N_2$÷2 as the false acceptance feature, where "γ" is a parameter representing the degree of reliability of the judgment, "α" is a parameter specifying the rate between the false rejection feature quantity and the false acceptance feature quantity, "θ" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

25. The non-transitory computer readable information recording medium according to claim 22, wherein: the false rejection feature quantity calculating process calculates the false rejection feature quantity by dividing the sum of sign-inverted feature quantities of the false rejected frames by the number of the labeled active voice frames, and the false accepted feature quantity calculating process calculates the false accepted feature quantity by dividing the sum of the sign-inverted feature quantities of the false accepted frames by the number of the labeled non-active voice frames.

26. The non-transitory computer readable information recording medium according to claim 22, wherein: the false rejection feature quantity calculating process calculates the sum $S_1$ of $f \times (1 - \tan h[\gamma \times \alpha \times (\theta - F) \div N_1])$ of frames previously labeled as active voice frames in regard to each feature quantity and obtains $S_1 \div N_{b \div 2}$ as the false rejection feature quantity, and the false acceptance quantity calculating process calculates the sum $S_2$ of $f \times (1 + \tan h[\gamma \times (1 - \alpha) \times (\theta - F) \div N_2])$ of frames previously labeled as non-active voice frames in regard to each feature quantity and obtains $S_2 \div N_2 \div 2$ as the false acceptance feature quantity, where "γ" is a parameter representing the degree of reliability of the judgment, "α" is a parameter specifying the rate between the false rejection feature quantity and the false acceptance feature quantity, "θ" represents the threshold value as the target of the comparison with the integrated feature quantity, "f" represents the feature quantity, "F" represents the integrated feature quantity, "$N_1$" represents the number of the labeled active voice frames, and "$N_2$" represents the number of the labeled non-active voice frames.

27. The non-transitory computer readable information recording medium according to claim 22, wherein: the feature quantity integrating process calculates the integrated feature quantity by calculating the difference between each feature quantity and an individual threshold value which has been set corresponding to the feature quantity and obtaining the sum of the product of the difference calculated for each feature quantity and a weight corresponding to the feature quantity, and the judgment process makes the judgment on whether each frame is an active voice frame or a non-active voice frame by setting the threshold value as the target of the comparison with the integrated feature quantity at 0.

28. The non-transitory computer readable information recording medium according to claim 22, wherein the method further comprises:

an error rate calculating process of calculating a false rejection error rate of misjudging a labeled active voice frame as a non-active voice frame and a false acceptance error rate of misjudging a labeled non-active voice frame as an active voice frame; and a threshold value updating process of updating the threshold value as the target of the comparison with the integrated feature quantity so that the rate between the false rejection error rate and the false acceptance error rate approaches a prescribed value.

29. The non-transitory computer readable information recording medium according to claim 27, the method further comprises:

an error rate calculating process of calculating a false rejection error rate of misjudging a labeled active voice frame as a non-active voice frame and a false acceptance error rate of misjudging a labeled non-active voice frame as an active voice frame; and a threshold value updating process of updating each individual threshold value so that the rate between the false rejection error rate and the false acceptance error rate approaches a prescribed value.

30. A voice activity detector comprising:

frame extracting means which extracts frames from an inputted sound signal;

feature quantity calculating means which calculates multiple feature quantities of each of the extracted frames;

feature quantity integrating means which calculates an integrated feature quantity as integration of the multiple feature quantities by weighting the multiple feature quantities; and judgment means which judges whether each of the frames is an active voice frame or a non-active voice frame by comparing the integrated feature quantity with a threshold value, wherein: the frame extracting means extracts frames from sample data as voice data in which whether each frame is an active voice frame or a non-active voice frame is already known, and the feature quantity calculating means calculates the multiple feature quantities of each of the frames extracted from the sample data, and the feature quantity integrating means calculates the integrated feature quantity of the multiple feature quantities, and the judgment means judges whether each of the frames extracted from the sample data is an active voice frame or a non-active voice frame by comparing the integrated feature quantity with the threshold value, and the voice activity detector further comprises:

false rejection feature quantity calculating means which calculates feature quantity regarding false rejected frames, and false acceptance feature quantity calculating means which calculates feature quantity regarding false accepted frames; and weight updating means which updates weights used by the feature quantity integrating means for the weighting of the multiple feature quantities so that the rate between the false rejection feature quantity calculating means and the false acceptance feature quantity calculating means approaches a prescribed value.

* * * * *